US008751948B2

(12) United States Patent
Wetzer et al.

(10) Patent No.: US 8,751,948 B2
(45) Date of Patent: Jun. 10, 2014

(54) METHODS, APPARATUS AND SYSTEMS FOR PROVIDING AND MONITORING SECURE INFORMATION VIA MULTIPLE AUTHORIZED CHANNELS AND GENERATING ALERTS RELATING TO SAME

(75) Inventors: Michael Wetzer, Fayetteville, NY (US); Thomas Theriault, Baldwinsville, NY (US)

(73) Assignee: Cyandia, Inc., Syracuse, NY (US)

( * ) Notice: Subject to any disclaimer, the term of this patent is extended or adjusted under 35 U.S.C. 154(b) by 519 days.

(21) Appl. No.: 13/086,165

(22) Filed: Apr. 13, 2011

(65) Prior Publication Data

US 2011/0252132 A1 Oct. 13, 2011

Related U.S. Application Data

(63) Continuation-in-part of application No. 12/465,331, filed on May 13, 2009, now Pat. No. 8,499,250.

(60) Provisional application No. 61/474,942, filed on Apr. 13, 2011, provisional application No. 61/435,976, filed on Jan. 25, 2011, provisional application No. 61/052,765, filed on May 13, 2008.

(51) Int. Cl.
*G06F 3/0482* (2013.01)

(52) U.S. Cl.
USPC ........... 715/769; 715/810; 715/835; 715/757; 715/864; 726/4; 455/414.2; 725/30; 725/46

(58) Field of Classification Search
CPC .............................. G06F 3/0482; G06F 3/0481
USPC ......................................................... 715/769
See application file for complete search history.

(56) References Cited

U.S. PATENT DOCUMENTS 5,742,286 A    4/1998   Kung et al.
5,960,411 A *   9/1999   Hartman et al. ........... 705/26.81

(Continued)

FOREIGN PATENT DOCUMENTS

EP    2 304 584    4/2011
JP    06-062142    4/1994

(Continued)

OTHER PUBLICATIONS

Extended European Search Report for EP Application No. 09747470.4, dated Oct. 12, 2011, 6 pages.

(Continued)

*Primary Examiner* — William Bashore
*Assistant Examiner* — Reza Nabi
(74) *Attorney, Agent, or Firm* — John D. Lanza; Foley & Lardner LLP

(57) ABSTRACT

Display of and access to secure user-centric information via the construct of a channel grid framework serving as a desktop on a user device. Multiple authorized channels through which the user receives and/or interacts with respective portions of the secure user-centric information are implemented based on information access rights and/or security protocols respectively associated with the channels. Channel information is monitored to determine one or more events, conditions, logical workflows, discrete information values or signal data, based on one or more threshold conditions or parameters relating to the channel information. Actionable and/or non-actionable alerts may be generated on one or more authenticated user devices and/or other devices. Information relating to determination of one or more events, conditions, logical workflows, discrete information values or signal data may be transmitted to various devices and/or stored for archival purposes.

36 Claims, 26 Drawing Sheets

(56) References Cited

U.S. PATENT DOCUMENTS

| | | |
|---|---|---|
| 6,189,008 B1 | 2/2001 | Easty et al. |
| 6,219,045 B1 | 4/2001 | Leahy et al. |
| 6,259,448 B1 | 7/2001 | McNally et al. |
| 6,396,513 B1* | 5/2002 | Helfman et al. ............... 715/752 |
| 6,421,009 B2* | 7/2002 | Suprunov .................... 342/465 |
| 6,658,432 B1 | 12/2003 | Warikoo et al. |
| 6,671,715 B1 | 12/2003 | Langseth et al. |
| 6,694,316 B1 | 2/2004 | Langseth et al. |
| 6,724,403 B1 | 4/2004 | Santoro et al. |
| 6,741,980 B1 | 5/2004 | Langseth et al. |
| 6,807,675 B1 | 10/2004 | Maillard et al. |
| 6,995,689 B2* | 2/2006 | Crank .......................... 340/970 |
| 7,028,264 B2 | 4/2006 | Santoro et al. |
| 7,136,871 B2 | 11/2006 | Ozer et al. |
| 7,181,417 B1 | 2/2007 | Langseth et al. |
| 7,375,678 B2 | 5/2008 | Feyereisen et al. |
| 7,376,907 B2 | 5/2008 | Santoro et al. |
| 7,478,337 B2 | 1/2009 | Kodosky et al. |
| 7,546,276 B2 | 6/2009 | Randle et al. |
| 7,564,469 B2 | 7/2009 | Cohen |
| 7,627,860 B2 | 12/2009 | Kodosky et al. |
| 7,681,230 B2 | 3/2010 | O'Brien |
| 7,711,475 B1 | 5/2010 | Cona et al. |
| 7,793,232 B2 | 9/2010 | Chaudhri et al. |
| 7,849,226 B2 | 12/2010 | Zigmond et al. |
| 7,873,371 B2 | 1/2011 | Oberg et al. |
| 7,933,632 B2* | 4/2011 | Flynt et al. .................. 455/569.1 |
| 7,979,854 B1 | 7/2011 | Borole et al. |
| 7,996,862 B2 | 8/2011 | Babu |
| 8,001,379 B2 | 8/2011 | Daskalopoulos et al. |
| 8,051,472 B2 | 11/2011 | Maes |
| 8,086,853 B2 | 12/2011 | Warwick |
| 8,276,196 B1 | 9/2012 | Shipley |
| 2002/0116256 A1 | 8/2002 | De Rafael et al. |
| 2002/0122063 A1 | 9/2002 | Weinberg et al. |
| 2002/0152117 A1 | 10/2002 | Cristofalo et al. |
| 2003/0018967 A1* | 1/2003 | Gorbatov et al. ................ 725/32 |
| 2003/0018972 A1 | 1/2003 | Arora |
| 2003/0035010 A1 | 2/2003 | Kodosky et al. |
| 2003/0058277 A1 | 3/2003 | Bowman-Amuah |
| 2003/0084436 A1 | 5/2003 | Berger et al. |
| 2003/0184595 A1 | 10/2003 | Kodosky et al. |
| 2004/0003247 A1 | 1/2004 | Fraser et al. |
| 2004/0015367 A1 | 1/2004 | Nicastro et al. |
| 2004/0025174 A1 | 2/2004 | Cerrato |
| 2004/0082345 A1* | 4/2004 | Lueckhoff .................. 455/456.3 |
| 2004/0148184 A1 | 7/2004 | Sadiq |
| 2005/0027676 A1 | 2/2005 | Eichstaedt et al. |
| 2005/0086612 A1 | 4/2005 | Gettman et al. |
| 2005/0114881 A1 | 5/2005 | Philyaw et al. |
| 2005/0137981 A1 | 6/2005 | Maes |
| 2005/0172018 A1 | 8/2005 | Devine et al. |
| 2005/0203771 A1 | 9/2005 | Achan |
| 2005/0246415 A1 | 11/2005 | Belfiore et al. |
| 2005/0278741 A1 | 12/2005 | Robarts et al. |
| 2006/0015818 A1 | 1/2006 | Chaudhri et al. |
| 2006/0027953 A1 | 2/2006 | Nakashima |
| 2006/0061580 A1 | 3/2006 | Fujiwara et al. |
| 2006/0271953 A1 | 11/2006 | Jacoby et al. |
| 2006/0271959 A1 | 11/2006 | Jacoby et al. |
| 2006/0271960 A1 | 11/2006 | Jacoby et al. |
| 2006/0271961 A1* | 11/2006 | Jacoby et al. .................... 725/46 |
| 2006/0271997 A1 | 11/2006 | Jacoby et al. |
| 2006/0277469 A1 | 12/2006 | Chaudhri et al. |
| 2006/0282312 A1 | 12/2006 | Carlson et al. |
| 2007/0018887 A1* | 1/2007 | Feyereisen et al. ............ 342/176 |
| 2007/0082707 A1* | 4/2007 | Flynt et al. .................... 455/564 |
| 2007/0083616 A1 | 4/2007 | Madden |
| 2007/0083911 A1 | 4/2007 | Madden et al. |
| 2007/0088952 A1 | 4/2007 | Hewitt et al. |
| 2007/0101291 A1 | 5/2007 | Forstall et al. |
| 2007/0101297 A1 | 5/2007 | Forstall et al. |
| 2007/0101368 A1 | 5/2007 | Jacoby et al. |
| 2007/0101433 A1 | 5/2007 | Louch et al. |
| 2007/0118813 A1 | 5/2007 | Forstall et al. |
| 2007/0124663 A1 | 5/2007 | Fischer et al. |
| 2007/0130541 A1 | 6/2007 | Louch et al. |
| 2007/0162850 A1 | 7/2007 | Adler et al. |
| 2007/0186103 A1* | 8/2007 | Randle et al. .................. 713/168 |
| 2007/0189737 A1 | 8/2007 | Chaudhri et al. |
| 2007/0192823 A1 | 8/2007 | Andersen et al. |
| 2007/0223462 A1 | 9/2007 | Hite et al. |
| 2007/0266400 A1 | 11/2007 | Rogers et al. |
| 2008/0005798 A1 | 1/2008 | Ross |
| 2008/0028338 A1 | 1/2008 | Kodosky et al. |
| 2008/0034309 A1 | 2/2008 | Louch et al. |
| 2008/0034314 A1 | 2/2008 | Louch et al. |
| 2008/0066011 A1* | 3/2008 | Urrabazo et al. ............. 715/810 |
| 2008/0104513 A1 | 5/2008 | Krogh |
| 2008/0111818 A1 | 5/2008 | Stambaugh |
| 2008/0120327 A1 | 5/2008 | Bhat |
| 2008/0126989 A1 | 5/2008 | Flores et al. |
| 2008/0129725 A1 | 6/2008 | Stambaugh |
| 2008/0134256 A1 | 6/2008 | DaCosta |
| 2008/0141170 A1 | 6/2008 | Kodosky et al. |
| 2008/0141174 A1 | 6/2008 | Kodosky et al. |
| 2008/0150963 A1 | 6/2008 | Stambaugh |
| 2008/0156869 A1* | 7/2008 | Carr et al. ...................... 235/380 |
| 2008/0168185 A1 | 7/2008 | Robbin et al. |
| 2008/0168245 A1 | 7/2008 | De Atley et al. |
| 2008/0168391 A1 | 7/2008 | Robbin et al. |
| 2008/0168526 A1 | 7/2008 | Robbin et al. |
| 2008/0172173 A1 | 7/2008 | Chang et al. |
| 2008/0172625 A1 | 7/2008 | Montgomery |
| 2008/0172632 A1 | 7/2008 | Stambaugh |
| 2008/0207327 A1 | 8/2008 | Van Luchene et al. |
| 2008/0235601 A1 | 9/2008 | Fried et al. |
| 2008/0256643 A1* | 10/2008 | Jones et al. ...................... 726/27 |
| 2008/0319828 A1 | 12/2008 | Southam et al. |
| 2009/0013263 A1* | 1/2009 | Fortnow et al. ............... 715/753 |
| 2009/0018712 A1 | 1/2009 | Duncan et al. |
| 2009/0021367 A1* | 1/2009 | Davies ........................ 340/539.1 |
| 2009/0025025 A1* | 1/2009 | Vleck et al. ..................... 725/14 |
| 2009/0091578 A1 | 4/2009 | Carnahan et al. |
| 2009/0094118 A1* | 4/2009 | Antonucci et al. ............... 705/14 |
| 2009/0113481 A1 | 4/2009 | Friedman |
| 2009/0132942 A1* | 5/2009 | Santoro et al. ................ 715/765 |
| 2009/0231128 A1* | 9/2009 | Watson et al. ................. 340/540 |
| 2009/0233542 A1 | 9/2009 | Gratton et al. |
| 2009/0249069 A1 | 10/2009 | Daskalopoulos et al. |
| 2009/0254842 A1* | 10/2009 | Leacock et al. ............... 715/757 |
| 2009/0259972 A1 | 10/2009 | Kodosky et al. |
| 2009/0287914 A1 | 11/2009 | Shah et al. |
| 2009/0298535 A1 | 12/2009 | Klein et al. |
| 2009/0315807 A1 | 12/2009 | Hsu |
| 2010/0017722 A1 | 1/2010 | Cohen |
| 2010/0023398 A1 | 1/2010 | Brown et al. |
| 2010/0031334 A1* | 2/2010 | Shaikh ............................. 726/7 |
| 2010/0057907 A1 | 3/2010 | Ross et al. |
| 2010/0058188 A1 | 3/2010 | Shah et al. |
| 2010/0080298 A1 | 4/2010 | Hang et al. |
| 2010/0083189 A1 | 4/2010 | Arlein et al. |
| 2010/0122196 A1 | 5/2010 | Wetzer et al. |
| 2010/0131443 A1* | 5/2010 | Agarwal et al. ................ 706/46 |
| 2010/0162172 A1 | 6/2010 | Aroner |
| 2010/0175081 A1 | 7/2010 | Boylan et al. |
| 2010/0254370 A1 | 10/2010 | Jana et al. |
| 2010/0274859 A1 | 10/2010 | Bucuk |
| 2010/0281107 A1 | 11/2010 | Fallows et al. |
| 2010/0299640 A1 | 11/2010 | Titus |
| 2010/0313146 A1* | 12/2010 | Nielsen et al. ................ 715/757 |
| 2011/0113379 A1* | 5/2011 | Doucet et al. ................. 715/838 |
| 2011/0141277 A1* | 6/2011 | Midkiff .......................... 348/143 |
| 2011/0161234 A1 | 6/2011 | Cuellar et al. |
| 2011/0252132 A1 | 10/2011 | Wetzer et al. |
| 2011/0252460 A1 | 10/2011 | Wetzer et al. |
| 2011/0252461 A1 | 10/2011 | Wetzer et al. |
| 2011/0258573 A1 | 10/2011 | Wetzer et al. |

(56) References Cited

U.S. PATENT DOCUMENTS

| | | |
|---|---|---|
| 2011/0283259 A1 | 11/2011 | Lawson et al. |
| 2012/0096267 A1 | 4/2012 | Daskalopoulos et al. |
| 2012/0210349 A1 | 8/2012 | Campana et al. |

FOREIGN PATENT DOCUMENTS

| | | |
|---|---|---|
| JP | 2006-053799 | 2/2006 |
| WO | WO-2004/066105 | 8/2004 |

OTHER PUBLICATIONS

International Search Report and Written Opinion for International Application No. PCT/US2009/043790, mailed Jun. 24, 2009, 8 pages.

International Search Report and Written Opinion for PCT Application No. PCT/US2012/022406, mailed May 10, 2012, 12 pages.

Linden Lab, How Meeting in Second Life Transformed IBM's Technology Elite Into Virtual World Believes, 8 pages.

Premium Agency, Inc. Develops MAJUA, Japan's First 3-D HD-Quality In-Browser Plugin, Dec. 1, 2008, http://www.premiumagency.com/majua/.

Project Darkstar, Project Darkstar Community-Home, Mar. 5, 2009, http://www.projectdarkstar.com/.

Project Wonderland Toolkit for Building 3D Virtual Worlds, lg3d-wonderland: Project Wonderland, Mar. 5, 2009, https://lg3d-wonderland.dev.java.net/.

US Notice of Allowance on 098944-0108 DTD May 23, 2013.
US Notice of Allowance on 098944-0108 DTD Jun. 21, 2013.
US Notice of Allowance on 098944-0129 DTD Aug. 5, 2013.
US Office Action on 098944-0108 DTD May 23, 2012.
US Office Action on 098944-0108 DTD Sep. 7, 2011.
US Office Action on 098944-0129 DTD Dec. 4, 2012.
US Office Action on 098944-0132 DTD Dec. 18, 2012.
US Office Action on 098944-0133 DTD Jan. 3, 2013.
US Office Action on 098944-0138 DTD May 8, 2013.
US Notice of Allowance on 098944-0133 DTD Sep. 17, 2013.
US Office Action on 098944-0132 DTD Oct. 1, 2013.
US Office Action on 098944-0138 DTD Nov. 15, 2013.

\* cited by examiner

METHODS, APPARATUS AND SYSTEMS FOR PROVIDING AND MONITORING SECURE INFORMATION VIA MULTIPLE AUTHORIZED CHANNELS AND GENERATING ALERTS RELATING TO SAME

CROSS-REFERENCES TO RELATED APPLICATIONS

This application also claims a priority benefit, under 35 U.S.C. §119(e), to U.S. provisional application Ser. No. 61/435,976, filed Jan. 25, 2011, entitled "Information Delivery System for, and Methods of, Interaction with Multiple Information Forms Across Multiple Types and/or Brands of Electronic Devices, such as Televisions, Mobile Phones, and Computing Devices."

This application also claims a priority benefit, under 35 U.S.C. §119(e), to U.S. provisional application Ser. No. 61/474,942, filed Apr. 13, 2011, entitled "Information Delivery System for, and Methods of, Eventing and Alerting Using Multiple Information Forms and Sources Across Multiple Types and/or Brands of Electronic Devices."

This application claims a priority benefit, under 35 U.S.C. §120, as a continuation-in part (CIP) of U.S. non-provisional application Ser. No. 12/465,331, filed May 13, 2009, entitled "Apparatus and Methods for Interacting with Multiple Information Forms Across Multiple Types of Computing Devices."

Ser. No. 12/465,331 in turn claims a priority benefit, under 35 U.S.C. §119(e), to U.S. provisional application Ser. No. 61/052,765, filed May 13, 2008, entitled "System and Method for Conducting Business in a Virtual World or Metaverse."

Each of the above-identified applications is hereby incorporated herein by reference in its entirety.

BACKGROUND

Consumer and business users want to access digital information such as broadcast TV; internet text, graphics, and video; and social networking media across different devices. These devices include laptop computers, smart phones, TVs, and tablets and each device has its own interface, content metaphor, format, and access method. Users' experience with digital content over different devices is poor for two reasons: 1) the quality of the information delivery is varied and, 2) users are required to learn how to use each device in order to receive their desired information. This learning process is time consuming and does not guarantee the users' success.

In addition, although certain technologies, such as Internet browsers and multimedia players, provide some centralized manner of accessing digital information, such technologies are largely static. As a result, these technologies cannot be customized for individual user preferences.

For example, in the broadcast TV environment, users select and receive information using traditional channel guides. With this technology, user interaction and information customization is extremely limited. The ability to combine broadcast TV content with other forms of information, such as social media, is restricted.

In other information areas such as healthcare, finance, and home security, users want to do more than just access information: users want to combine and interrogate information to produce more meaningful interactions with information and other users.

SUMMARY

Various embodiment of the present invention relate generally to monitoring secure sources of information to determine particular aspects, trends, and/or values associated with the information, and providing one or more alerts in connection with same.

In exemplary embodiments discussed in greater detail below, display of and access to secure user-centric information is provided via the construct of a channel grid framework serving as a desktop on one or more user devices. Multiple authorized channels represented in the channel grid framework, and through which the user receives and/or interacts with respective portions of the secure user-centric information, are implemented based on information access rights and/or security protocols respectively associated with the channels.

In one aspect, channel information is monitored to determine one or more events, conditions, logical workflows, discrete information values or signal data, based on one or more threshold conditions or parameters relating to the channel information. For example, monitored channel information may be compared to one or more threshold conditions or parameters, and various criteria for such comparisons may be predetermined/established (e.g., less than, greater than, equal to, within a certain range, corresponding to a certain pattern or trend, particular time-varying behavior, etc.). In another aspect, if an established condition is met (e.g., the comparison meets one or more criteria, such as exceeding a quantified numerical limit, and/or multiple similar events trending in a certain direction), a "trigger" is established upon which one or more alerts may be generated. For purposes of the present disclosure, any information associated with establishing a trigger upon which one or more alerts may be generated is referred to as "trigger information." Examples of trigger information may include, but are not limited to, one or more values or other information content associated with monitored channel information that resulted in a trigger (e.g., one or more events, conditions, logical workflows, discrete information values or signal data), one or more date stamps and/or time stamps associated with values/information content that resulted in a trigger, identities of one or more content sources providing at least some of the channel information being monitored and resulting in a trigger, and the criterion/criteria used to establish the trigger.

In other aspects, actionable and/or non-actionable alerts may be generated (e.g., in response to one or more triggers) on one or more authenticated user devices and/or other devices. Information relating to determination of one or more events, conditions, logical workflows, discrete information values or signal data (e.g., trigger information) may be transmitted to various devices and/or stored for archival purposes.

In sum, one embodiment of the present invention is directed to an apparatus to provide secure user-centric information on at least one user platform operated by a user, and to evaluate at least some of the secure user-centric information. The apparatus comprises: at least one communication interface to facilitate wired and/or wireless communications with the at least one user platform via one or more transmission media; at least one memory to store processor-executable instructions; and at least one processor communicatively coupled to the at least one communication interface and the at least one memory. Upon execution of the processor-executable instructions by the at least one processor, the at least one processor provides and evaluates at least some of the secure user-centric information by: A) implementing, at least in part, a plurality of authorized channels through which the user receives and/or interacts with, via the at least one user platform, respective portions of the secure user-centric information based at least in part on information access rights and/or security protocols respectively associated with the plurality of authorized channels, the plurality of authorized channels including at least a first channel through which the user receives and/or interacts with first channel information constituting a first portion of the secure user-centric information; B) monitoring at least the first channel information so as to determine one or more events, conditions, logical workflows, discrete information values or signal data, based on at least one threshold condition or parameter relating to the first channel information; and if the one or more events, conditions, logical workflows, discrete information values or signal data is/are determined in B): C) controlling the at least one communication interface to transmit at least one alert to, or transmit data so as to generate at least one alert on, at least one external device; and/or D) controlling the at least one memory so as to store trigger information relating to the one or more determined events, conditions, logical workflows, discrete information values or signal data.

Another embodiment is directed to a computer-implemented method for evaluating secure user-centric information to be provided on at least one user platform operated by a user. The method comprises: A) electronically implementing, at least in part, a plurality of authorized channels through which the user receives and/or interacts with, via the at least one user platform, respective portions of the secure user-centric information based at least in part on information access rights and/or security protocols respectively associated with the plurality of authorized channels, the plurality of authorized channels including at least a first channel through which the user receives and/or interacts with first channel information constituting a first portion of the secure user-centric information; B) electronically monitoring at least the first channel information so as to determine one or more events, conditions, logical workflows, discrete information values or signal data, based on at least one threshold condition or parameter relating to the first channel information; and if the one or more events, conditions, logical workflows, discrete information values or signal data is/are determined in B): C) electronically transmitting at least one alert to, or transmitting data so as to generate at least one alert on, at least one external device; and/or D) electronically storing event information relating to the one or more determined events, conditions, logical workflows, discrete information values or signal data.

Another embodiment is directed to at least one non-transitory computer readable storage medium encoded with processor-executable instructions that, when executed by at least one processor, perform a method for evaluating secure user-centric information to be provided on at least one user platform operated by a user. The method comprises: A) implementing, at least in part, a plurality of authorized channels through which the user receives and/or interacts with, via the at least one user platform, respective portions of the secure user-centric information based at least in part on information access rights and/or security protocols respectively associated with the plurality of authorized channels, the plurality of authorized channels including at least a first channel through which the user receives and/or interacts with first channel information constituting a first portion of the secure user-centric information; B) monitoring at least the first channel information so as to determine one or more events, conditions, logical workflows, discrete information values or signal data, based on at least one threshold condition or parameter relating to the first channel information; and if the one or more events, conditions, logical workflows, discrete information values or signal data is/are determined in B): C) transmitting at least one alert to, or transmitting data so as to generate at least one alert on, at least one external device; and/or D) storing event information relating to the one or more determined events, conditions, logical workflows, discrete information values or signal data.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the figures, described herein, are for illustration purposes only, and that the drawings are not intended to limit the scope of the disclosed teachings in any way. In some instances, various aspects or features may be shown exaggerated or enlarged to facilitate an understanding of the inventive concepts disclosed herein (the drawings are not necessarily to scale, emphasis instead being placed upon illustrating the principles of the teachings). In the drawings, like reference characters generally refer to like features, functionally similar and/or structurally similar elements throughout the various figures.

DETAILED DESCRIPTION

Figure 1:
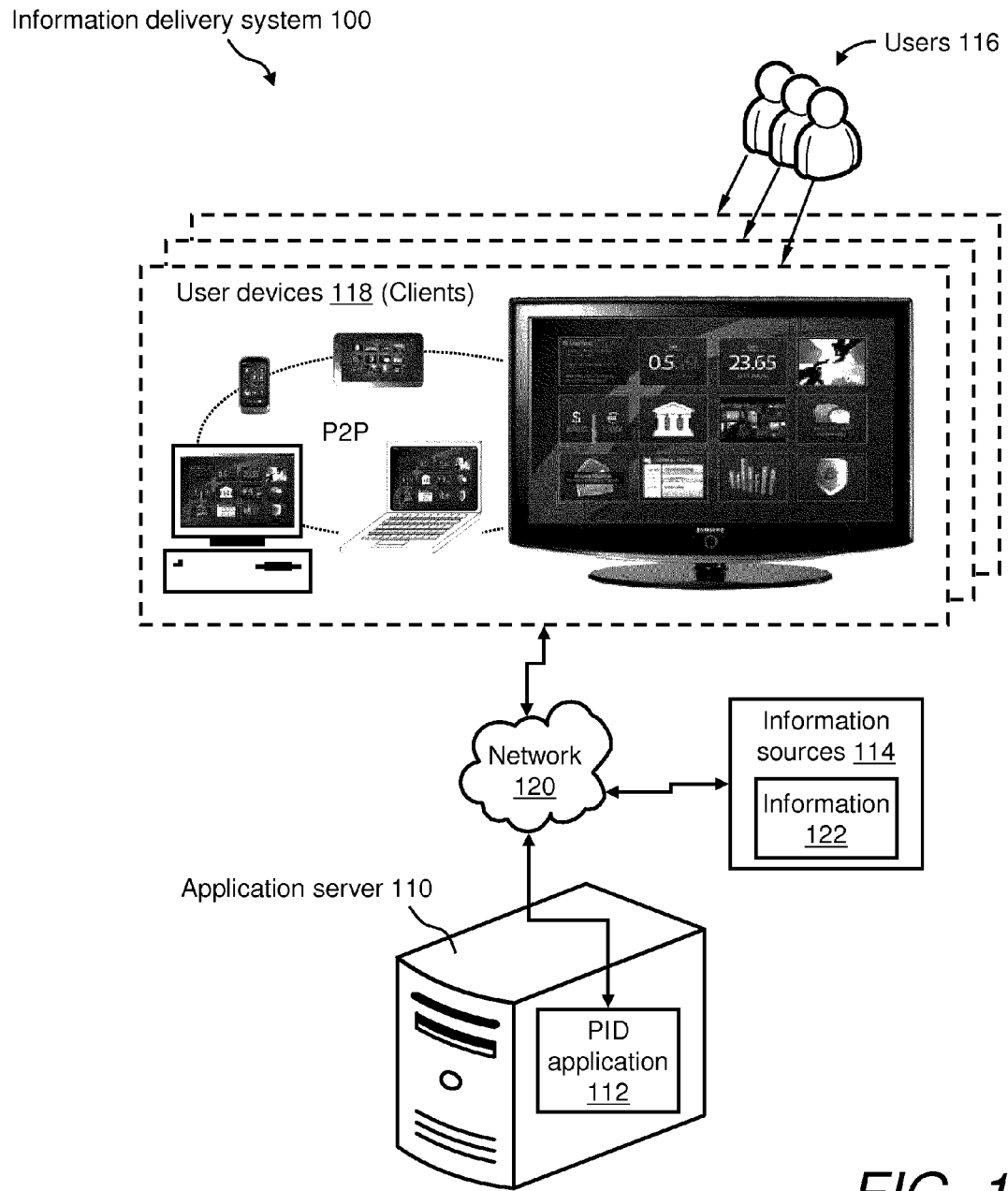
FIG. 1 illustrates a high level block diagram of an example of an information delivery system that includes a personal information delivery application for eventing and alerting using multiple information forms and sources across multiple types and/or brands of electronic devices, according to one embodiment of the present invention.

Following below are more detailed descriptions of various concepts related to, and embodiments of, inventive methods, apparatus and systems for providing and monitoring secure information via multiple authorized channels and generating alerts relating to same. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Various embodiments of the present invention describe an information delivery system for, and methods of, eventing and alerting using multiple information forms and sources across multiple types and/or brands of electronic devices, such as televisions, mobile devices, and computing devices.

The information delivery system for and methods of the invention provide the display of and access to secure user-centric information via the construct of a channel grid framework serving as a desktop on a user device. The channel grid framework includes multiple user-selectable items that provide access to corresponding "channels" by which respective portions of user-centric information are delivered to a user. The user and the user device are first authenticated to receive the secure user-centric information, and the user-selectable items included in the channel grid framework on the desktop for the user device are based on information access rights and security protocols defined for the corresponding channels, the user, and the user device.

An aspect of the information delivery system and methods of the invention is the server-side capability to monitor/interrogate channel information of one or more channels to detect events and generate alerts. In one embodiment, a secure user-centric information provider implements multiple "channels" through which a user receives and/or interacts with respective portions of user-centric information, via one or more user platforms, based on information access rights/security protocols associated with the channels. Channel information in one or more channels is monitored at the server and/or client to determine one or more events, conditions, logical workflows, discrete information values or signal data, based on at least one threshold condition or parameter. For example, monitored channel information may be compared to one or more threshold conditions or parameters, and various criteria for such comparisons may be predetermined/established (e.g., less than, greater than, equal to, within a certain range, corresponding to a certain pattern or trend, particular time-varying behavior, etc.).

In one aspect of this embodiment, if an established condition is met (e.g., the comparison meets one or more criteria, such as exceeding a quantified numerical limit, and/or multiple similar events trending in a certain direction), a "trigger" is established upon which one or more alerts may be generated. For purposes of the present disclosure, any information associated with establishing a trigger upon which one or more alerts may be generated is referred to as "trigger information." Examples of trigger information may include, but are not limited to, one or more values or other information content associated with monitored channel information that resulted in a trigger (e.g., one or more events, conditions, logical workflows, discrete information values or signal data), one or more date stamps and/or time stamps associated with values/information content that resulted in a trigger, identities of one or more content sources providing at least some of the channel information being monitored and resulting in a trigger, and the criterion/criteria used to establish the trigger. In one example, discrete information values or signal data may be based on time of day.

In other aspects, actionable and/or non-actionable alerts may be generated (e.g., in response to one or more triggers) on one or more authenticated user devices and/or other devices. Information relating to determination of one or more events, conditions, logical workflows, discrete information values or signal data (e.g., trigger information) may be transmitted to various devices and/or stored for archival purposes.

Another aspect of the information delivery system and methods of the invention is that is may provide two types of eventing and alerting (1) actionable alerts and (2) non-actionable alerts. With respect to actionable alerts, the user may be alerted to a condition that is important to them. Upon the presence of the alert condition, the user may be presented a means by which to take action on the alert. With respect to non-actionable alerts, the user may be alerted to a condition that is important to them and then may choose or not choose to take action. For example, a non-actionable alert may simply be an informational alert that does not require user action.

Yet another aspect of the information delivery system and methods of the invention is that configuration, user preferences, and session information may be used to determine automatically the optimal method of delivering alert notifications to users. Additionally, if the best method of delivering the alert is unsuccessful and/or not available, the next best delivery method is attempted.

Still another aspect of the information delivery system and methods of the invention is that data from one or more disparate data sources may be collected and analyzed with respect to performing eventing and alerting operations. Additionally, eventing and alerting processes of the invention may be based on (1) the direct query of any external system and/or service, and/or (2) monitoring data (e.g., machine and/or sensor data) that is collected and stored locally at the server.

Referring to FIG. 1, a high level block diagram of an example of an information delivery system 100 that includes a personal information delivery (PID) application 112 for eventing and alerting using multiple information forms and sources across multiple types and/or brands of electronic devices is presented. Information delivery system 100 may include an application server 110 upon which is installed the PID application 112 that has access to one or more information sources 114. One or more users 116 are associated with information delivery system 100. Users 116 may be, for example, individuals or groups of individuals. Each user 116 may have one or more user devices 118. Application server 110, the one or more information sources 114, and user devices 118 may be connected to a network 120 by any wired and/or wireless means. Network 120 may be, for example, any local area network (LAN) and/or wide area network (WAN) for connecting to the Internet.

Application server 110 may be a networked computer, such as the networked server of the owner and/or provider of PID application 112. The one or more information sources 114 may be, for example, networked computers of the owners and/or providers of the information stored thereon. For example, certain information 122 may be stored on information sources 114. Information 122 may be any information that can be delivered electronically over network 120 and that is capable of being consumed by users 116 via their user devices 118. More particularly, information 122 of the one or more information sources 114 may include different types and/or forms of information, data, and/or content. Examples of information 122 may include, but are not limited to, text, graphics, pictures, 3D graphic visualization of objects, sound, sensor data, streaming media data (e.g., streaming video and audio data), web-services data, Really Simple Syndication (RSS) feeds, image data, eventing and alerting, raw data, any type of information, and the like.

Information 122 of information sources 114 may be any information that resides outside of the environment of application server 110. However, with regard to information to be consumed by users 116 via their user devices 118, the invention is not limited to "external" information sources, such as information sources 114. Users 116 may also consume information from "internal" information sources (not shown), which are any information sources that reside directly at application server 110 and/or directly at user devices and/or from sensors contained on or communicating with user devices 118.

PID application 112 is a software application that facilitates user interaction with multiple information forms across multiple types and/or brands of electronic devices (e.g., user devices 118). Generally, PID application 112 is operating under a client-server model of computing in which application server 110 is the server and each user device 118 is the client.

Preferably, user devices 118 have a runtime environment that includes, but is not limited to, the following attributes: 1) capability to access multiple different operating systems; 2) capability to access any information that is exposed at the device level; 3) capability to allow software and/or information updates without interrupting the device and/or service (i.e., "hot" updates); 4) capability to operate offline; 5) capability to maintain state information, and 6) any combinations of the foregoing.

An example of such a runtime environment is the Adobe® AIR® 2.5 runtime (available from Adobe Systems Inc, San Jose, Calif.) and the HTML5 runtime. HTML5 is the next major revision of the HTML standard, which is currently under development.

For the purpose of illustration, the present invention is described hereafter with respect to user devices 118 (i.e., client devices) that are Adobe Air-enabled. Therefore, examples of user devices 118 may include, but are not limited to, any type and/or brand of Adobe Air-enabled desktop computer, Adobe Air-enabled laptop computer; Adobe Air-enabled tablet computer; Adobe Air-enabled net-book computing device; Adobe Air-enabled handheld computing device; Adobe Air-enabled personal digital assistant, Adobe Air-enabled enterprise digital assistant, or Adobe Air-enabled portable digital assistant; Adobe Air-enabled telecommunications device including one of an Adobe Air-enabled telephone, Adobe Air-enabled cell phone, and Adobe Air-enabled smart phone; Adobe Air-enabled personal navigation device; Adobe Air-enabled vehicle-based device; Adobe Air-enabled optical disk player; Adobe Air-enabled television; Adobe Air-enabled game console; and the like.

Therefore, an aspect of information delivery system 100 of the invention is that its operation is not limited to any particular type and/or brand of client device and/or to any particular operating system (OS). That is, the operation of information delivery system 100 of the invention is substantially device-agnostic and/or OS-agnostic because it may operate, for example, on substantially any Air-enabled client device. Additionally, information delivery system 100 of the invention is substantially information type-agnostic and/or information source-agnostic.

User devices 118 serve as a user platform operated by a user 116 to facilitate display of, and interaction with, secure user-centric information. Preferably, the set of user devices 118 belonging to each respective user 116 is connected in a peer-to-peer (P2P) fashion. In one example, the user devices 118 of a certain user 116 may include a mobile phone, a tablet, a laptop computer, a desktop computer, and a television. In this example, the user's mobile phone, tablet, laptop computer, desktop computer, and television are connected (wired and/or wirelessly) in a P2P fashion.

PID application 112 of the invention provides a personalized information delivery utility that includes one or more sets of processor-executable instructions executing on one or more processors controlling various other hardware devices, with client-server system architecture, to facilitate delivery of a wide variety of information to a user, via one or more user devices or "platforms" (clients). Information is displayed on a graphical user interface (GUI) of a given user platform in a "presentation framework" that is customized based on a "user context." The presentation framework is homogenous amongst different user platforms so as to facilitate user familiarity and ease of interaction with displayed information. The presentation framework also facilitates the user's ability to take meaningful "real-time" action(s) in response to the displayed information.

The "user context" may be with respect to user attributes, such as, but not limited to, identity of the user, an identifier for one or more user devices associated with the user, location, activity, role, event, and any combinations thereof. Further, the "user context" may be with respect to user preferences, such as, but not limited to, source(s) of information of interest to the user, category/type of information of interest to the user, priority and/or importance of information, time (of day, week, month, year) at which information is displayed, and any combinations thereof.

The mechanism of PID application 112 for providing the user access to and interaction with, for example, information 122 and/or any other information is referred to as a "channel." That is, the channel is a conduit for delivering information to a user (e.g., providing access to and interaction with information), and is an elemental feature (basic building-block) of PID application 112. With respect to the PID application 112, the channel two pieces (1) a visualization piece that is presented on the client device (e.g., user devices 118) and (2) the integration piece residing at the server (e.g., application server 110). More details of the channel with respect to PID application 112 are described with reference to FIGS. 2 through 6.

Figure 2:
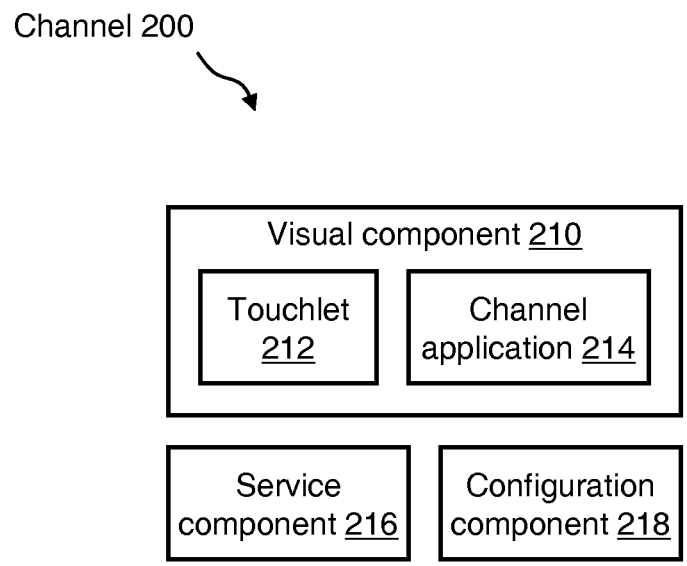
FIG. 2 illustrates a functional block diagram of an example of a channel of a personal information delivery application for providing users access to and interaction with information and for performing eventing and alerting operations, according to one embodiment of the present invention.

Referring to FIG. 2, a functional block diagram of an example of a channel 200 of PID application 112 for providing users access to and interaction with information and for performing eventing and alerting operations is presented. PID application 112 may provide at least one channel 200. Preferably, PID application 112 provides one or more function-specific channels 200. There may be a server portion of channel 200 that is resident at application server 110 and a client portion of channel 200 that is resident at each user device 118. The client side portion of channel 200 is for presenting and interacting with content. There is a server side portion of channel 200 provides services and that are always running. More details of the client architecture and server architecture underlying the client and server portions of any channel 200 are described with reference to FIGS. 4 through 6.

Any channel 200 of PID application 112 provides a gateway to content, such as information 122 of information sources 114. Additionally, each channel 200 has a built in eventing and alerting feature, which will be described in subsequent text. Each channel 200 may include a visual component 210 that is formed of a touchlet 212 and a channel application 214. Additionally, channel 200 may include one or more service components 216 and a configuration component 218.

Visual component 210 may be any text and/or graphic element that may be presented to users 116 for viewing on the display, screen, and/or GUI of any user device 118. With respect to a certain function-specific channel 200, the design and implementation of visual component 210 may be channel-specific. That is, visual component 210 may be used to visually render at least some of the function-specific information on a GUI of a user device 118 via one or more text and/or graphic elements, and provide for interaction with the displayed channel information. The invention is not limited to presenting information to users 116 in a visual fashion only. Other ways (not shown) of conveying information to users 116 may be, for example, audible indicators (i.e., sound) and/or tactile indicators (e.g., vibration).

Channel application 214 may be any application software that is designed to perform singular and/or multiple related specific tasks and/or functions of a certain channel 200. Channel application 214 is used to manage the visual rendering of at least some of the channel-specific information on a GUI of a user device 118. Channel application 214 is also designed and used to manage user interaction with the displayed channel information.

Some channel applications 214 support implementation of the channel in a "full screen mode" on the GUI of a user device 118 once the channel 200 is deployed on the platform of PID application 112 and a channel 200 is invoked by a user (i.e., selected by the user to operate in substantially full-screen mode). A user invokes a certain channel 200 via its respective touchlet 212. Touchlet 212 includes a graphic element associated with its channel 200 that appears on a portion of the GUI of a user device 118, as part of the presentation framework, to provide a gateway/portal to its channel 200. A touchlet 212 has multiple behaviors as described with reference to FIG. 3. One example of a function-specific channel 200 and the associated touchlets 212 is described with reference to FIGS. 9 and 13.

The one or more service components 216 of a channel 200 are used to access information from outside the environment of PID application 112. For example, service components 216 are used to retrieve the information 122 from the authorized information source(s) 114 and securely provide the retrieved information 122 to any visual components 210 of a channel 200 for display to user. Additionally, service components 216 may be used to monitor/process the channel information (e.g., via event processing and/or complex event processing (CEP)) to derive "secondary" information (e.g., events—particular changes in state or content of channel information), and provide secondary information to any visual components 210 for conveying to the user (e.g., alerts).

Every channel 200 has at least one service that is invokes via service components 216. For example, one service is an identity service. The identity service may be used for (1) authenticating and authorizing users 116 to use a channel 200 and (2) authenticating channels 200 to invoke one or more services (at the server) in order to access content from, for example, authorized information source(s) 114. Every service has identity. The authorization and authentication is by channel, in this way authorization and authentication does not have to occur for each information request.

Configuration component 218 of any channel 200 includes information that defines the behaviors and "personality" of the channel 200. Configuration component 218 also includes user preferences. Further, the information in configuration component 218 defines the services being used, the data being used, alerts, user preferences for the content and alerts, state information, synchronization information, versioning information, and the like.

There are additional authorization aspects of each channel 200. For example, user authorization may be based on user identity, user role, user device, user/device location, time, date, day of week, and the like. For example, a certain user 116 is authorized to access certain content at his/her workplace location between 8 am and 8 pm, and only with his/her laptop computer that has a certain MAC address. At application server 110, configuration queries the identity subsystem (shown in FIGS. 4 and 6) to understand any user permissions. The user may be generally authorized to use a channel 200, but there may be conditions.

Because there is two pieces to each channel 200, the client side visualization piece and the server side integration piece, an aspect of the invention is that there is operational persistence at the server. Client devices may be shut down, but the channels are still operating on the server and services are still being run. As client devices become available, content will begin to stream.

A "presentation framework" is the manner in which information (generally multiple types or classes of information) is visually rendered (displayed to a user via a GUI of a user device 118) by PID application 112. The presentation framework is customized at least in part based on a user context (e.g., user attributes and/or preferences) and the presentation framework may sometimes purposefully constrain the scope and/or type of the information displayed on a GUI of a user device at any given time. The presentation framework thereby allows a user to interact with more limited information that may be particularly important to them in a given user context. This purposeful limitation on displayed information facilitates the user's ability to meaningfully absorb and respond to the information (e.g., take real-time action and/or make decisions in response to the displayed information).

PID application 112 provides a presentation framework that is homogenous amongst different user platforms so as to facilitate user familiarity and ease of interaction with available information; i.e., the presentation framework "follows a user around" from user device 118 to user device 118 and appears the same or substantially the same to the user on any GUI of any user device 118 on which the "client portion" of PID application 112 is installed.

A presentation framework includes one or more user-selectable items, or "touchlets" that are selectable by a user (e.g., via touch-screen and/or point and click, sound recognition, movement recognition or image recognition user interfaces) so as to invoke a "channel," through which one or more particular types of information are displayed to the user on the GUI of the user platform in a substantially full-screen mode. More details of one example of a presentation framework of PID application 112 are described with reference to FIG. 3.

Figure 3:
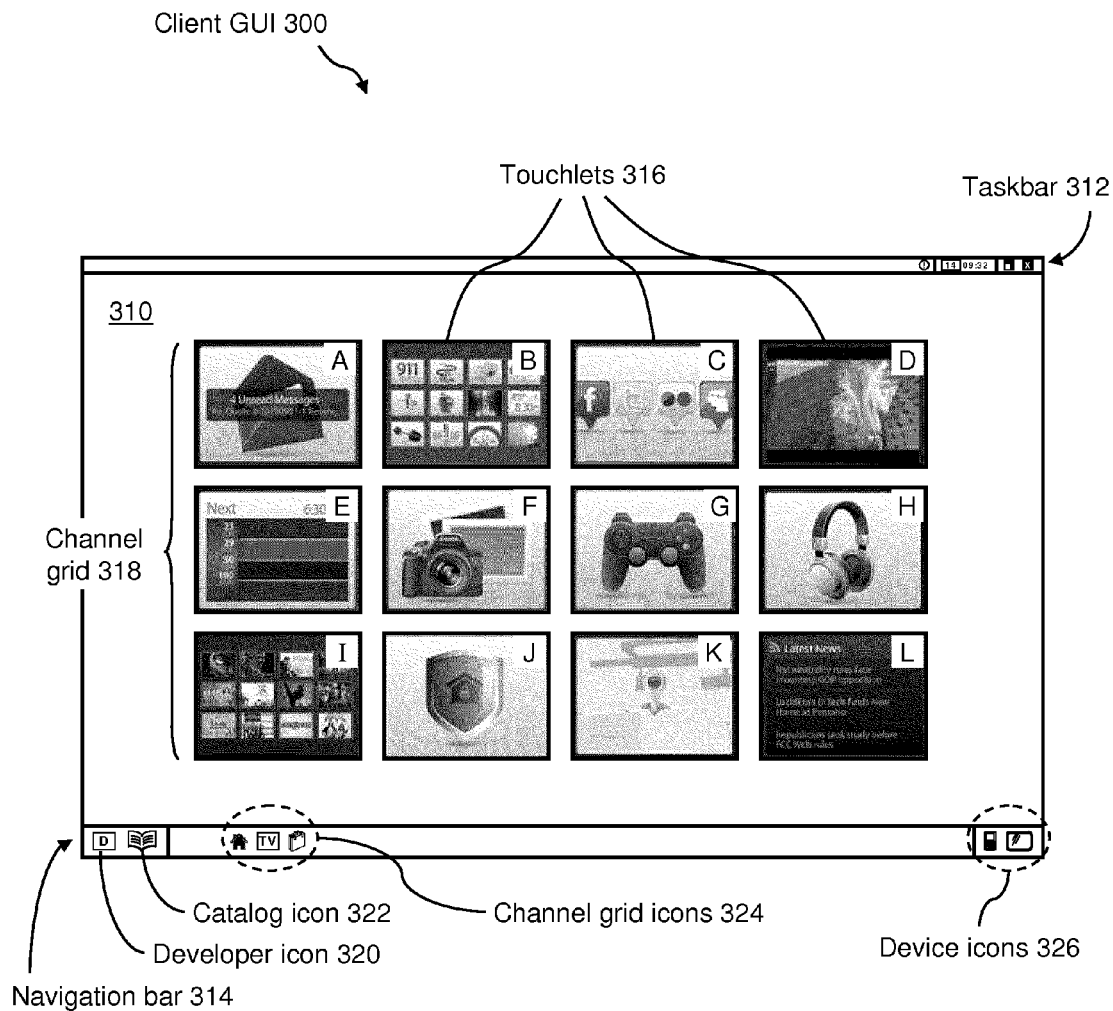
FIG. 3 illustrates a screenshot of an example of a client GUI that shows an example of a channel grid, which is one example of a presentation framework of the personal information delivery application, according to one embodiment of the present invention.

Referring to FIG. 3, a screenshot of an example of a client GUI 300 is presented that shows an example of a channel grid, which is one example of a presentation framework of PID application 112. Client GUI 300 may include, for example, a main viewing panel 310. Additionally, a taskbar 312 may be provided along the top of main viewing panel 310 and a navigation bar 314 may be provided along the bottom of main viewing panel 310.

Taskbar 312 may include, for example, standard calendar, time, window controls, and the like. Navigation bar 314 may include, for example, icons for launching other applications, icons of other user devices 118, and the like. For example, navigation bar 314 may include a developer icon 320, a catalog icon 322, and certain device icons 326. The developer icon 320 may be used to launch a "developer environment" that may be built into the framework of PID application 112. The catalog icon 322 may be used to launch an "application store" by which users 116 may acquire (e.g., purchase) and then install and synchronize specific channels 200. Device icons 326 may depict any types of user devices 118 in the user's P2P network, such as a mobile phone, a tablet device, any computing device, a television, and the like.

Client GUI 300 shows an example of a presentation framework that is organized into a grid for presenting channels 200 to a user 116 on any user device 118. In this example, multiple touchlets 316 are presented in a 3×4 channel grid 318 in the main viewing panel 310 of client GUI 300. For example, 3×4 channel grid 318 includes touchlets 316A through 316L. Each touchlet 316 in the 3×4 channel grid 318 of client GUI 300 represents a channel 200 of a specific purpose and/or function. User 116 may have multiple channel grids of information, which are accessible via the navigation bar 314. For example, navigation bar 314 may include certain channel grid icons 324, which are icons of other channel grids of the user. In one example, channel grid icons 324 may include an "At Home" channel grid icon, a "My TV" channel grid icon, and an "At Work" channel grid icon. A user 116 may specify a certain default channel grid in his/her profile. Additionally, as defined in the user's profile, the default channel grid may change based upon, for example, device type, time, location, prior activities, and the like. Further, user 116 may be presented an option of several different channel girds from which to select. In one example, the channel grid 318 shown in main viewing panel 310 of client GUI 300 of FIG. 3 may be the user's "At Home" channel grid.

Presentation of channel grids may change based upon user context or preferences. Generally, PID application 112 is capable to combine, screen, and/or synthesize information in any way to present information in an intelligent manner to the user. The invention is not limited to presenting content in a 3×4 or any other n×n channel grid. Other presentation styles are possible. For example, the touchlets of channels may be presented in a tiled fashion on a 3D cube, a tiled fashion on a 3D globe, a stacked tiled fashion, and the like.

A touchlet 212 of channel 200 of FIG. 2, such as touchlets 316A through 316L of FIG. 3, has multiple behaviors—(1) a touchlet 212 may serve as an icon to launch its associated channel application 214 to full screen mode, (2) a touchlet 212 may receive dynamically streaming data, such as audio and video data, sensor data, any web-services data, RSS feeds, eventing and alerting, raw data, any type of information, and the like. Data may be pushed to the channel 200 and its touchlet 212 in near real time, and (3) a touchlet 212 may serve as a viewer for presenting information dynamically in near real time.

Additionally, a touchlet 212 may include substantially all the functionality of a full channel application. The "touchlet information" typically is related to or derived from the channel information provided by the corresponding channel associated with the touchlet, so that when visually rendered, the touchlet information provides a more limited but nonetheless intuitive representation of the channel information. Therefore, an aspect of the invention is that the construct of a channel 200 includes two levels of presentation (1) information that is streaming and/or displayed at the touchlet level and (2) information that is streaming and/or displayed at the full screen level that is launched via the touchlet.

Unlike standard icons and windows that are static and have little or no built-in intelligence, touchlets 212 have both static and dynamic behaviors, as well as intelligence. For example, touchlets 212 can provide information in context (e.g., context based on certain relationships between different data sources, time of day, day of week, geographic location, devices, users, user's role, and the like). Therefore, an aspect of the invention is that touchlets may be designed to present only information that is most interesting and/or meaningful to the user, and with context. Another aspect of the invention is that touchlets provide mechanisms for taking action and/or making decisions on that information.

An aspect of the invention is that multiple touchlets in a channel grid may be displaying near real-time dynamic content to the user simultaneously. For example, the twelve touchlets 316 in 3×4 channel grid 318 of client GUI 300 may be displaying near real-time dynamic content simultaneously (e.g., 12 streaming videos) to the user 116. Again, the content presented in each touchlet is designed to present only what is important to the user without saturating the user with content he/she does not want or need.

Another purpose and/or function of a touchlet 212, such as touchlets 316A through 316L of FIG. 3, is that a touchlet 212 is capable of visually presenting static and/or dynamic content to a user 116 in a small window, until such time that the user 116 launches the associated channel application 214 in full-screen mode. For example, in near real time, application server 110 is pushing dynamic information from any sources to one or more touchlets 316 in near real time.

Figure 4:
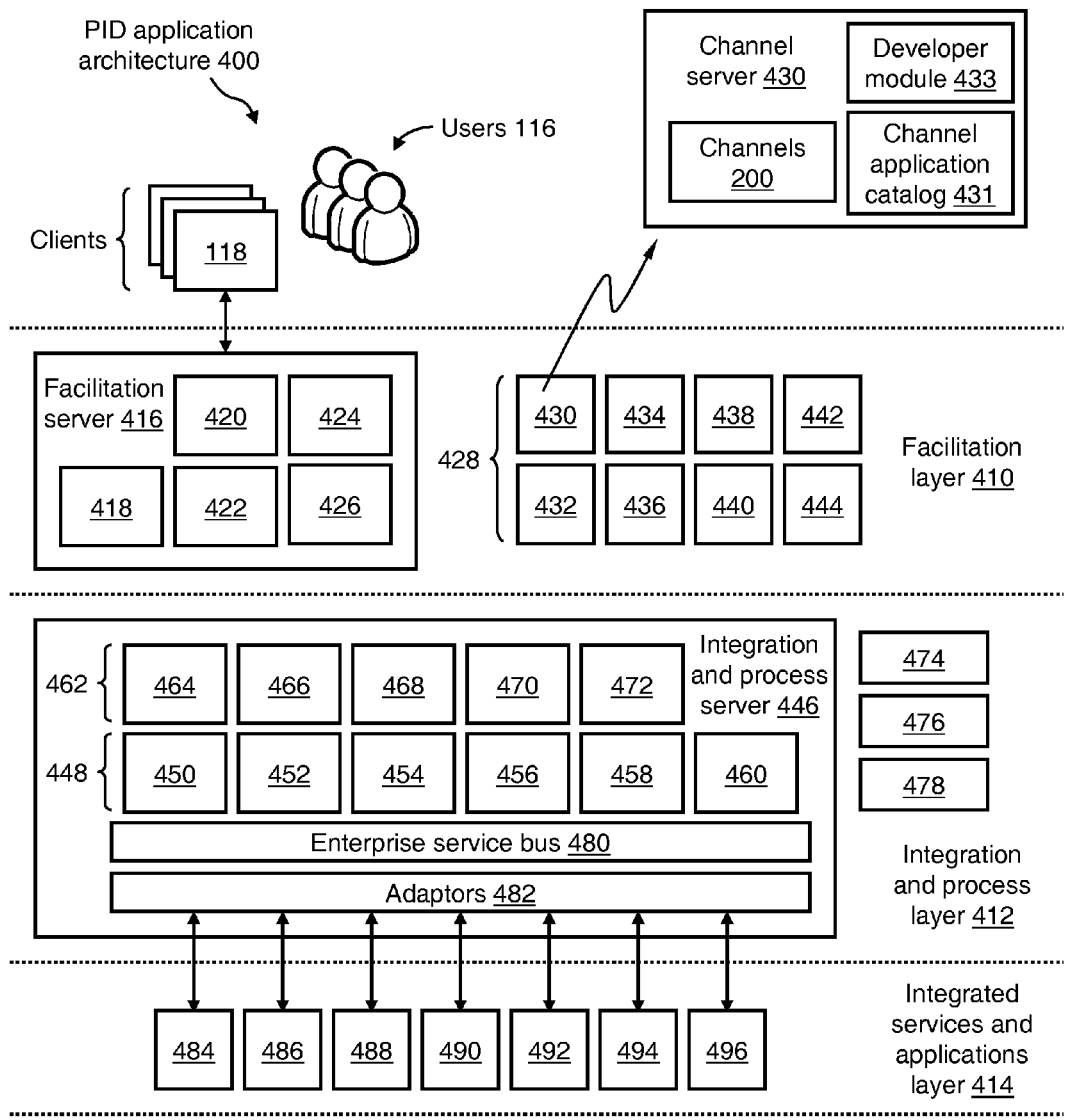
FIG. 4 illustrates a functional block diagram of an example of a personal information delivery application architecture that is suitable for performing eventing and alerting operations, according to one embodiment of the present invention.

Referring to FIG. 4, a functional block diagram of an example of a PID application architecture 400 that is suitable for performing eventing and alerting operations is presented. PID application architecture 400 is the application architecture of the server side of PID application 112. That is, PID application architecture 400 is the application architecture of application server 110. PID application architecture 400 may include a facilitation layer 410 through which all messaging of user devices 118 (the clients) pass, an integration and process layer 412, and an integrated services and applications layer 414.

Facilitation layer 410 further includes a facilitation server 416 and certain other servers 428. Generally, facilitation server 416 manages the communication between the client (e.g., user devices 118) and the server (e.g., application server 110). Facilitation server 416 serves as the gate keeper. In a sense, facilitation server 416 introduces the client to the integration and process server 446 and then goes away. Facilitation server 416 serves as the client representative to the rest of the server stack. In one example, facilitation server 416 is implemented using a Java server component that provides a set of real-time data management and messaging capabilities. One example of this Java server component may be Adobe® LiveCycle® Data Services.

Facilitation server 416 of the facilitation layer 410 may include, for example, a client gateway 418, proxy services 420, invocation services 422, inter-client messaging/synchronization 424, and a facilitation processor 426.

Client gateway 418 may be the direct interface with the client (e.g., user devices 118) for handling messaging operations. In one example, client gateway 418 uses Action Message Format (AMF) and/or Java Message Service (JMS) for exchanging messages and/or data between the client and server and/or between one client and another client.

Servers 428 of the facilitation layer 410 may include, for example, a channel server 430, a content delivery server 432, a collaboration media server 434 (e.g., video conferencing server), a stream sync server 436, an analytics server 438, an advertising server 440, a transcoding server 442, and a media server 444.

Generally, channel server 430 is used for the creation and consumption of channels 200. Channel server 430 is not utilized in the operation of channels 200. For example, channel server 430 may include a repository of channels 200, a channel application catalog 431, and a developer module 433. Channel application catalog 431 may be an "application store" of available channels 200 from which users 116 may acquire (e.g., purchase), download, and install and synchronize specific channels 200.

Developer module 433 may be the "developer environment" that may be built into the framework of PID application 112. For example, developer module 433 may be used by software developers to design specific channels 200. In one example, the developer icon 320 of client GUI 300 of FIG. 3 may be used to launch the developer module 433.

Content delivery server 432 may be a server for storing and/or managing any other content that is not managed by, for example, collaboration media server 434, advertising server 440, and media server 444. Collaboration media server 434 is used to facilitate video conferencing. Stream sync server 436 is the server that integrates with advertising and analytics as it relates to the client and content that is being presented. An example of using stream sync server 436 is synchronizing and/or relating ads on one user device 118 (e.g., TV) with ads on another user device 118 (e.g., tablet). Analytics server 438 is used to configure and administer analytics applications. Advertising server 440 may be a dedicated server for storing and/or managing advertising content. Media server 444 may be a dedicated server for storing and/or managing various digital media, such as digital videos/movies, audio/music, and picture files.

Transcoding server 442 may be a dedicated server for performing transcoding operations. Transcoding is the ability to adapt digital files so that content can be viewed on different playback devices. Working like an interpreter, a transcoder translates files to a suitable format for the end user. Transcoding servers (e.g., transcoding server 442) and services reformat material that would otherwise have to be developed separately for different platforms. Transcoding servers and services are commonly used for adapting content for mobile devices or serving video.

Integration and process layer 412 may be organized in a standard service-oriented architecture (SOA). Integration and process layer 412 further includes an integration and process server 446 along with certain hosting applications 474, hosted communications applications 476, and integral identity provider SSO provider 478. Integration and process server 446 of integration and process layer 412 further includes certain platform service components 448 and certain server channel components 462.

Platform service components 448 may include, but are not limited to, a data management subsystem 450, an eventing and alerting subsystem 452, a configuration server 454, a session manager 456, an administration subsystem 458, and an identity subsystem 460.

Data management subsystem 450 performs the master data management operations of PID application architecture 400. Master data management may include, for example, correlating user ID (which user are you?) to content and/or correlating user devices (user has 4 phones, which phone are you?) to content. Associated with data management subsystem 450 may be an operational data store (ODS) (not shown) and/or a data warehouse (not shown) for storing temporary data or long term data. The ODS may serve two purposes (1) the ODS is used to store data for historical purposes, because data may not persist or be stored at the source. For example, a channel 200 may poll a service every few minutes and store the data in the ODS; and (2) the ODS is used in general application usage. For example, there is a background process of any channel 200 of PID application 112 that is retrieving data and pushing it to the ODS. Therefore, any data that is presented to the user at the user device 118 (i.e., at the client device) may be supplied by the ODS. This ensures good response time for the end-user because the network will not have to be continually interrogated for information.

Eventing and alerting subsystem 452 is used to collect and/or analyze information from any one or more disparate data sources with respect to certain predetermined or dynamic event conditions. Example of types of information that may be evaluated/monitored by eventing and alerting subsystem 452 may include, but are not limited to, text information, graphic information, one or more pictures, one or more videos, audio or digital sound, streaming data, audio or video, content associated with an executing computer application, voice-over-IP communication, instant messaging/SMS information, video-conferencing information, environmental monitoring information, financial services information, enterprise resource planning information, enterprise content management information, building information, project management information, product lifecycle management information, RSS reader information, remote device control/interaction information, a three-dimensional graphic visualization of one or more objects and/or immersive environments, one or more word processing documents, one or more spreadsheets, one or more presentation/slide shows, email, address book information, and any combinations thereof. CEP systems may also be utilized to evaluate/monitor event conditions.

Upon detecting the presence of an event condition, eventing and alerting subsystem 452 transmits alert notifications to users 116 via one or more user devices 118. Eventing and alerting subsystem 452 may include, for example, an event manager component, a notification manager, and a complex event processor. Further, events maybe stored for delivery at a later time or for use in a CEP system.

Once an event is registered in the event manager of the eventing and alerting subsystem 452, the event manager uses CEP (e.g., via complex query language (CQL) programming)

to continually monitor the ODS of data management subsystem 450 based on event(s) that have been set and/or to perform a direct query of any external system and/or service.

Once the event manager recognizes that a certain event condition is present, the notification manager checks the user's configuration, which is at configuration server 454, as well as the user's session information at session manager 456 in order to determine how best to notify the end-user. Then, the alert notification is pushed through the client gateway 418 of the facilitation server 416 (e.g., via AMF) and to one or user devices 118 (client devices). As a result, the one or user devices 118 receive the alert notification and the alert presented to the user 116 via one or user devices 118.

Example of types of alerts that may be generated by eventing and alerting subsystem 452 may include, but are not limited to, visual alerts, auditory alerts, tactile alerts, email messages, SMS text messages, activation of at least one channel of a plurality of channels, and notifications to a law enforcement agency.

A main aspect of a channel 200 is that eventing and alerting subsystem 452 provides actionable eventing and alerting capability to the user 116. That is, channels 200 of PID application 112 provide users the ability to take action upon receiving an alert, in which the mechanism for user response to an alert may be conveniently built into the channel itself.

Configuration server 454 manages device configurations, user profiles, data configurations, application configurations, and the like. Configuration server 454 is the counterpart to configuration component 218 of any channel 200.

Session manager 456 performs session management and/or handles state. Session manager 456 may include, for example, a session module and a policy module. In one example of managing state, a user 116 is watching TV (one user device 118) and decides to pause the TV show and resume watching the TV show on his/her laptop computer (another user device 118). Session manager 456 stores state information and communicates this state information between user devices 118 so that the user 116 can resume watching the TV show at his/her laptop computer from the same point in the broadcast.

Administration subsystem 458 is used to perform standard system administration tasks. For example, when a channel 200 is accepted into the channel application catalog 431, the administration subsystem 458 associates what users 116 are allowed to access the channel. With respect to authorizations, channels are assigned to groups and users. For example, anyone working in the accounting department of a company has access to a certain channel or only a certain user's family members are allowed access to a certain channel.

Identity subsystem 460 manages the authorization of users, places, times, and things. Identity subsystem 460 may include, for example, an authorize module and an authenticate module. For example, users must be authorized for content, services must be authorized for content. Accordingly, services check to ensure that users are authorized to access their services.

A main aspect of PID application 112 of the invention is single sign-on (or universal sign-on) capability, wherein once the user 116 is activated on the system, the user 116 is automatically authenticated when accessing any applications that normally require user login, i.e., unified access to all applications. That is, once the user 116 logs into information delivery system 100, the user will not be prompted for any other login operations when accessing information and/or services via PID application 112. For example, the user 116 may have one or more secure email services, one or more secure banking and/or financial accounts, one or more secure web-services accounts, and the like. Login information of all the user's secure accounts is stored, for example, identity subsystem 460. When a user access these secure accounts, identity subsystem 460 automatically provides the necessary login credentials to the requesting entity, thereby automatically logging in the user with no further action on the user's part. Because mulitple user devices 118 may be associated with a user 116, PID application 112 requires that the user 116 login on each of his/her user devices 118 as they become available in order to ensure the identity of the user 116.

In a location-based example, a user 116 is authorized to use a certain user device 118 and/or service only when inside his/her place of business. Therefore, upon leaving the building the authorization is revoked. In a time-based example, a user 116 is authorized to use a certain user device 118 and/or service only at a certain time of day, perhaps during off-peak hours. Therefore, during off-peak hours the authorization is allowed, but during peak hours the authorization is revoked.

Generally, server channel components 462 are used to perform the integration. Server channel components 462 may include Java-based components, such as, but not limited to, a Camel server channel component 464, a Spring server channel component 466, a Java server channel component 468, a JavaScript server channel component 470, a business process execution language (BPEL) server channel component 472.

Camel server channel component 464 may be, for example, the Apache Camel server channel component (available from The Apache Software Foundation). Camel server channel component 464 is used for the orchestration and integration of services. Spring server channel component 466 is used for implementing Inversion of Control (IoC) and aspect-oriented programming (AOP). For example, when passing information from one component to another, the components involved have placeholders for data to be injected (or inserted). Spring server channel component 466 is used to manage this process. Java server channel component 468 may be implemented via (e.g., Java 2 Platform Standard Edition (J2SE)). JavaScript server channel component 470 is used for running JavaScript on the server side of PID application 112. BPEL server channel component 472 is used to export and import information by using web service interfaces.

With respect to integration and process layer 412, certain unique tasks are possible, independent of the source of the content. For example, sensor data and streaming media data are being normalized, which allows the capability to combine content. Therefore, a main aspect of the invention is that PID application 112 is agnostic to the source of the content and agnostic to the user device on which it is presented. From a client perspective, PID application 112 is agnostic to what content sources are connected.

The components of PID application architecture 400 communicate via an enterprise service bus 480 of integration and process server 446. Enterprise service bus 480 manages "calls" in and out of the PID application architecture 400. A set of adaptors 482 are connected to enterprise service bus 480 for interfacing with entities of integrated services and applications layer 414, which are outside of the environment of application server 110. That is, adaptors 482 are connected to enterprise service bus 480 for handling various communication protocols.

Integrated services and applications layer 414 may include, but is not limited to, one or more third-party services 484, one or more relational database management systems (RDBMS) 486, Parlay X 488 (i.e., a set of standard Web service APIs for the telephone network), one or more IP multimedia subsystem (IMS) servers 490, basic wireline telecommunication 492, one or more communications modules 494 (e.g., instant message, calendar, mail/SMS, address book), and one or more directory servers 496.

An aspect of the invention is that PID application 112 provides built in security at the application server 110, which inherently provides security at each user device 118. Any applications running in the environment of PID application 112 are checked for viruses, spyware, and the like. In this way, it is ensure that users 116 are operating in a secure environment.

Figure 5:
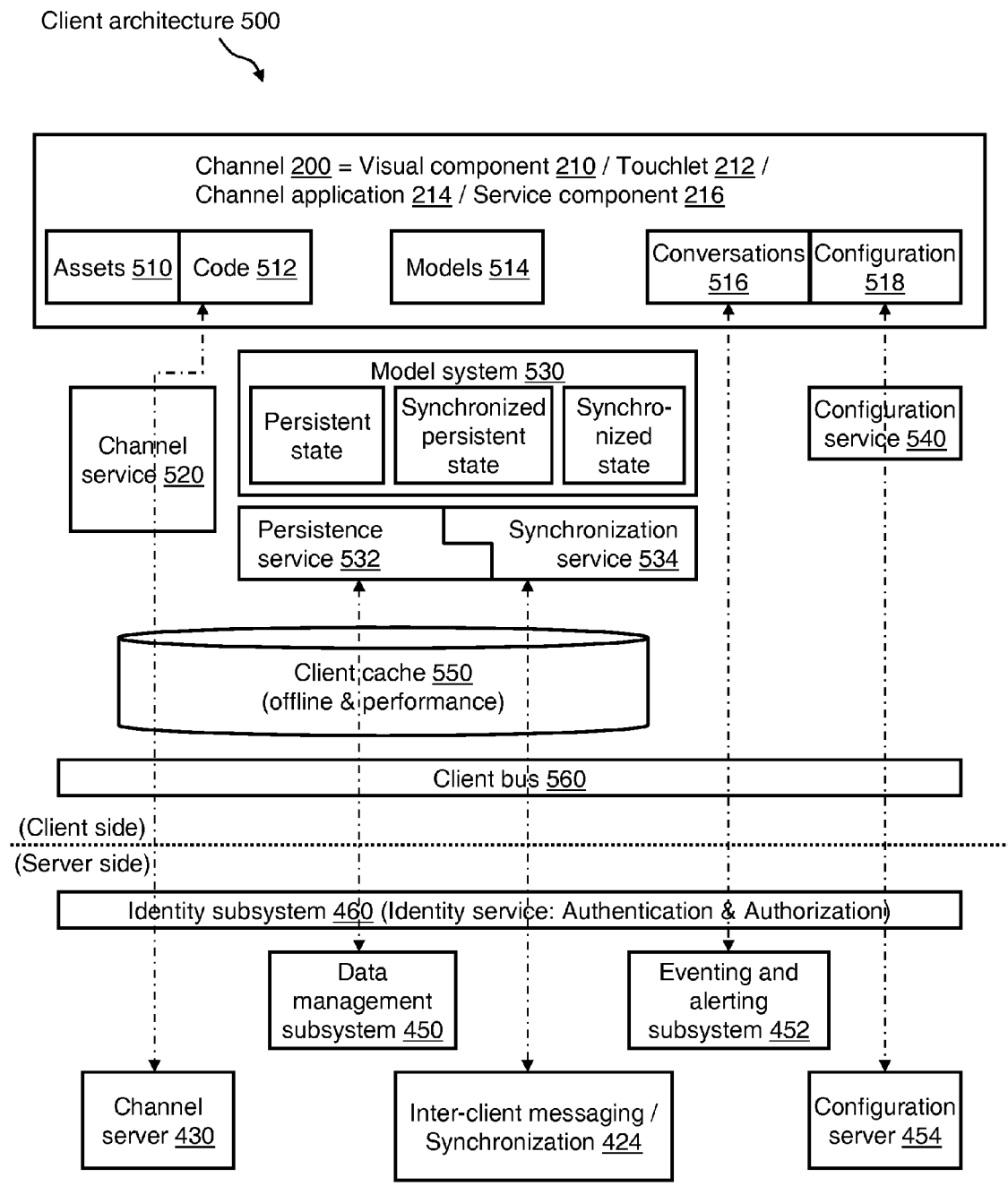
FIG. 5 illustrates a functional block diagram of an example of a client architecture of the personal information delivery application, according to one embodiment of the present invention.

Referring to FIG. 5, a functional block diagram of an example of client architecture 500 of PID application 112 is presented. Client architecture 500 is the application architecture of the client side of PID application 112. That is, client architecture 500 is the application architecture of any user device 118.

FIG. 5 shows a channel 200, which includes visual component 210, touchlet 212, channel application 214, and service component 216. Associated with a channel 200 are certain sub-components, such as assets 510, code 512, models 514, conversations 516, as well as configuration 518.

Assets 510 may be, for example, images, descriptive language for the layout of the channel, and the like. Code 512 is the actual programming code for the channel 200. A channel service 520 on the client side communicates with the channel server 430 on the server side. Code 512 interacts with channel service 520 in the client. Additionally, code 512 is cached in client cache 550 and then transmitted via a client bus 560 to identity subsystem 460 (performing authentication and authorization) and then to channel server 430. Any channels 200 that are installed on a user device 118 originate from channel server 430 (e.g., from channel application catalog 431).

Models 514 may be the data models for the channel 200. A model system 530 on the client side may include user-defined models, persistent models, synchronized persistent models, synchronized models, and the like. Associated with model system 530 may be a persistence service 532 and a synchronization service 534. Models 514 interact with persistence service 532 and synchronization service 534 in the client. Persistence service 532 on the client side communicates with the data management subsystem 450 on the server side. Synchronization service 534 on the client side communicates with the inter-client messaging/synchronization 424 on the server side. Additionally, models 514 are cached in client cache 550 and then transmitted via client bus 560 to identity subsystem 460 (performing authentication and authorization) and then to inter-client messaging/synchronization 424.

Conversations 516 may be any communication over the bus between client components and/or server components. Conversations 516 on the client side are transmitted via client bus 560 to the eventing and alerting subsystem 452 on the server side.

Configuration 518 may define, for example, the position of the touchlet on the channel grid, that the channel now monitoring a certain data stream, the user is receiving data and needs to be synchronized, the user has multiple devices that need to be synchronized, when any application is installed perform synchronization, location, ID, the channel is a synchronizable channel, the channel is an alertable channel, and the like. Configuration 518 includes any channel attributes that convey the "personality" or functionality of the channel. Certain information in configuration 518 may be selected by the user.

A configuration service 540 on the client side communicates with the configuration server 454 on the server side. Configuration 518 interacts with configuration service 540 in the client. Additionally, configuration 518 is transmitted via client bus 560 to identity subsystem 460 (performing authentication and authorization) and then to configuration server 454.

Client architecture 500 of the client side of PID application 112 is architected similar to an SOA for an enterprise stack. The client services use the idea of GUI conversations to exchange messages between client components and/or server components, all using the client bus and/or server bus. Therefore, an aspect of the invention is a sophisticated client architecture, similar to an SOA, that allows complex processing to occur locally at the client as well as at the server (yet without relying on the server), thereby enabling a rich user experience.

Figure 6:
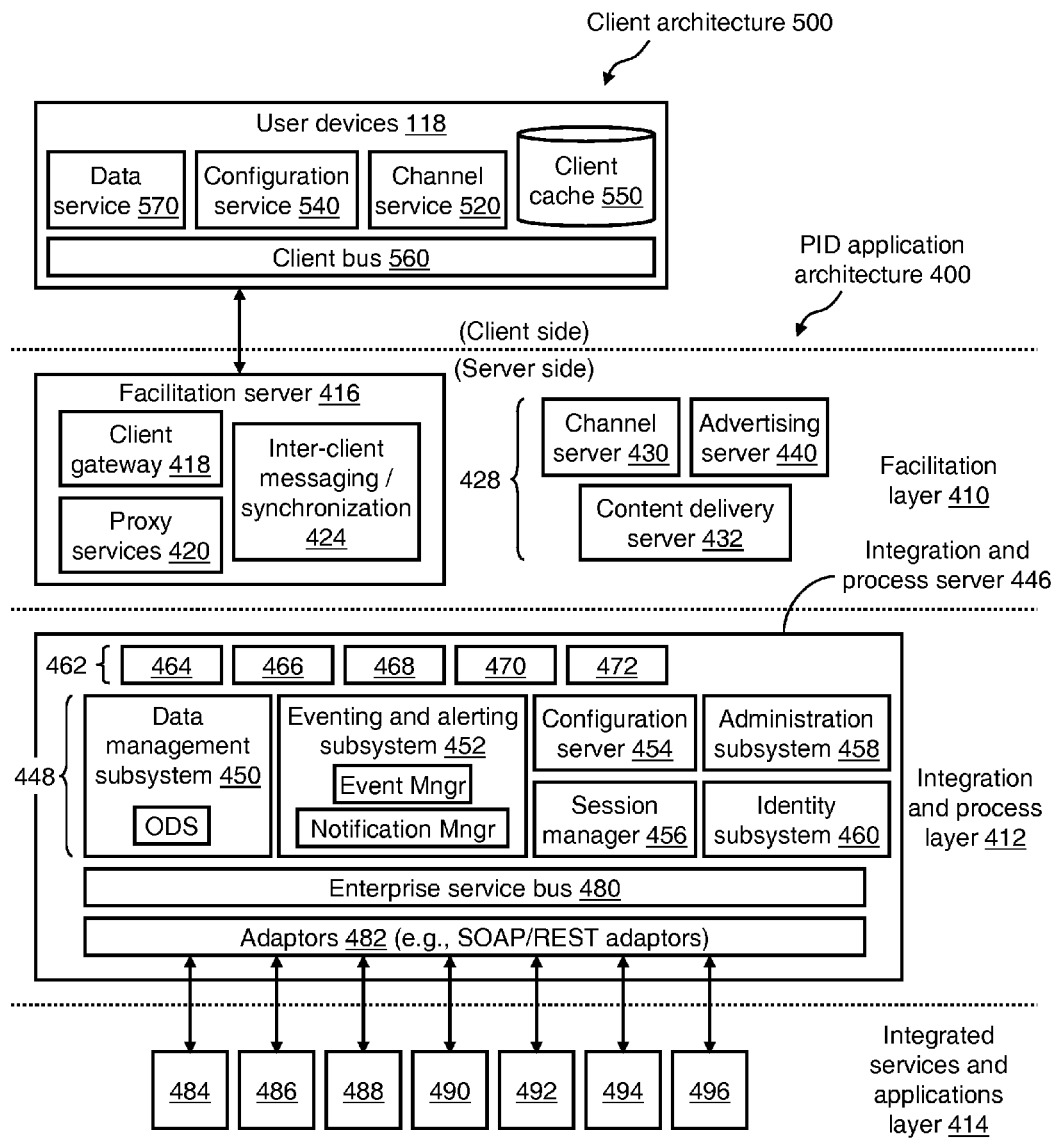
FIG. 6 illustrates a functional block diagram of a portion of the personal information delivery application architecture along with a portion of the client architecture, according to one embodiment of the present invention.

Referring to FIG. 6, a functional block diagram of a portion of PID application architecture 400 of FIG. 4 along with a portion of client architecture 500 of FIG. 5 is presented. FIG. 6 is provided for reference with respect to the example methods of performing eventing and alerting that are described with reference to FIGS. 7A through 25.

Figure 7A:
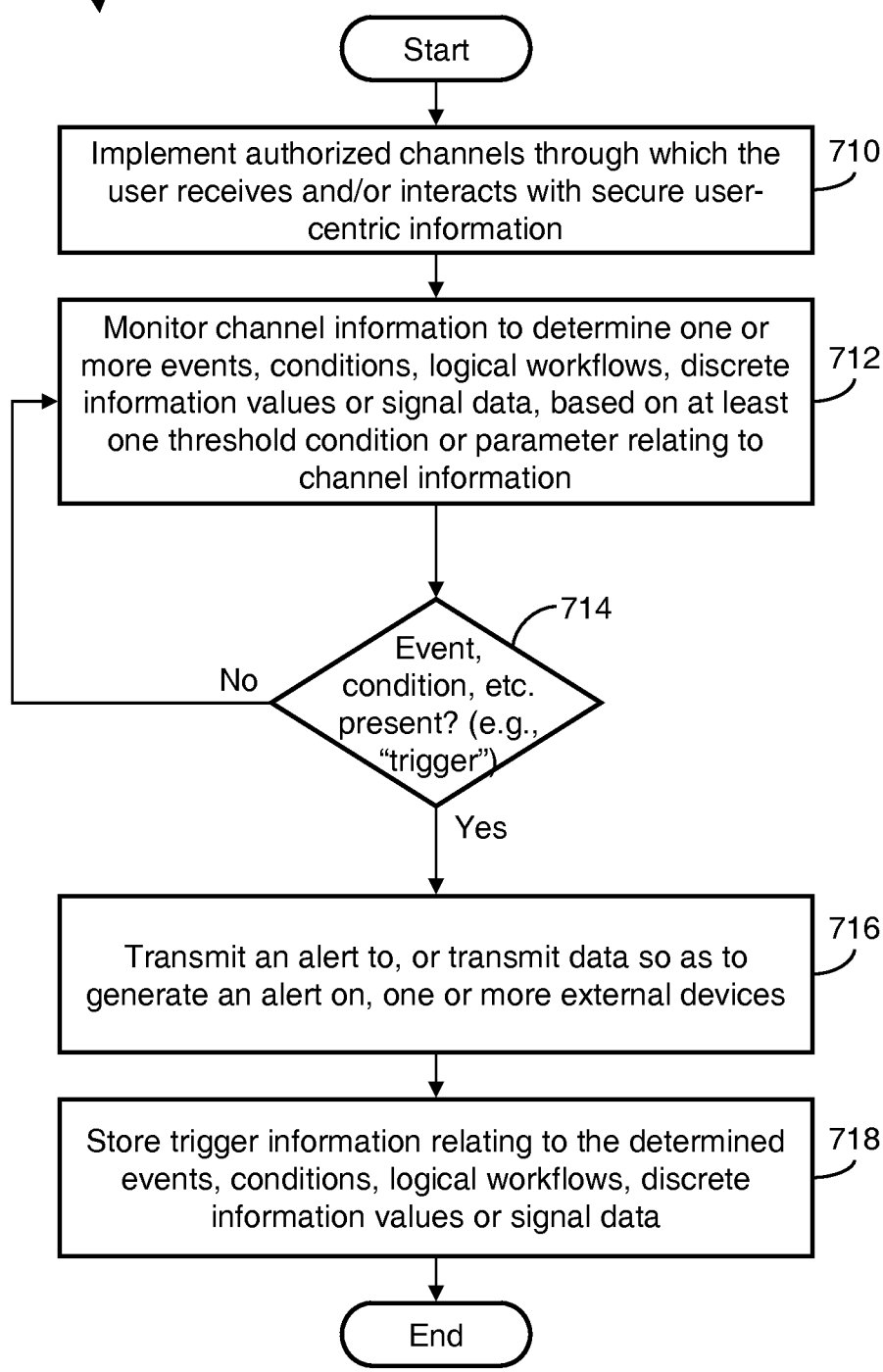
FIG. 7A illustrates a flow diagram of an example of a method of evaluating at least some of the secure user-centric information using the personal information delivery application, according to one embodiment of the present invention.

Referring to FIG. 7A, a flow diagram of an example of a method 700 of evaluating at least some of the secure user-centric information using PID application 112 is presented. Method 700 of FIG. 7A may include, but is not limited to, the following steps.

At step 710, authorized channels are implemented (e.g., at least in part by application server 110) through which the user receives and/or interacts with secure user-centric information. For example, using developer module 433, which is the developer environment that is built into the framework of PID application 112, developers may design a plurality of authorized channels 200, through which users 116 may receive and/or interact with respective portions of the secure-user-centric information. In particular, these channels may be implemented by the application server 110 (e.g., via one or more processors executing processor-executable instructions), and users 116 may access implemented channels via one or more user platforms communicatively coupled to the application server 110. Respective portions of the secure user-centric information provided by the channels are based at least in part on information access rights and/or security protocols respectively associated with the plurality of authorized channels 200. Relevant information associated with implementation of the channels 200 is stored at channel server 430.

At step 712, channel information is monitored to determine one or more events, conditions, logical workflows, discrete information values or signal data, based at least in part on at least one threshold condition or parameter relating to channel information. For example, the event manager of the eventing and alerting subsystem 452 of integration and process server 446 continually monitors channel information to determine the presence of one or more events, conditions, logical workflows, discrete information values or signal data, based on at least one threshold condition or parameter relating to certain channel information.

At decision step 714, if one or more events, conditions, logical workflows, discrete information values or signal data is present, method 700 may proceed, for example, to step 716. However, if one or more events, conditions, logical workflows, discrete information values or signal data is not present, method 700 may return, for example, to step 712.

For example, monitored channel information may be compared to one or more threshold conditions or parameters and, as discussed in greater detail below, various criteria for such comparisons may be predetermined/established (e.g., less than, greater than, equal to, within a certain range, corresponding to a certain pattern or trend, particular time-varying behavior, etc.). In one aspect, if an established condition is met (e.g., the comparison meets one or more criteria, such as exceeding a quantified numerical limit, and/or multiple similar events trending in a certain direction) such that a presence of one or more events, conditions, logical workflows, discrete information values or signal data is determined, a "trigger" is established upon which one or more alerts may be generated. For purposes of the present disclosure, any information associated with establishing a trigger upon which one or more alerts may be generated is referred to as "trigger information." Examples of trigger information may include, but are not limited to, one or more values or other information content associated with monitored channel information that resulted in a trigger (e.g., one or more events, conditions, logical workflows, discrete information values or signal data), one or more date stamps and/or time stamps associated with values/information content that resulted in a trigger, identities of one or more content sources providing at least some of the channel information being monitored and resulting in a trigger, and the criterion/criteria used to establish the trigger. In one example, discrete information values or signal data may be based on time of day.

In one aspect, actionable and/or non-actionable alerts may be generated (e.g., in response to one or more triggers) on one or more authenticated user devices and/or other devices. For example, at step 716, the communication interface is controlled to transmit an alert to, or transmit data so as to generate an alert on, an external device. In one example, client gateway 418 of facilitation server 416 may be used to transmit at least one alert to, or transmit data so as to generate at least one alert on, at least one user device 118.

In another aspect, information relating to determination of one or more events, conditions, logical workflows, discrete information values or signal data (e.g., trigger information) may be transmitted to various devices and/or stored for archival purposes. For example, at step 718, the memory is controlled so as to store trigger information relating to the determined events, conditions, logical workflows, discrete information values or signal data. In one example, trigger information relating to the one or more determined events, conditions, logical workflows, discrete information values or signal data may be stored in data management subsystem 450 of integration and process server 446.

Figure 7B:
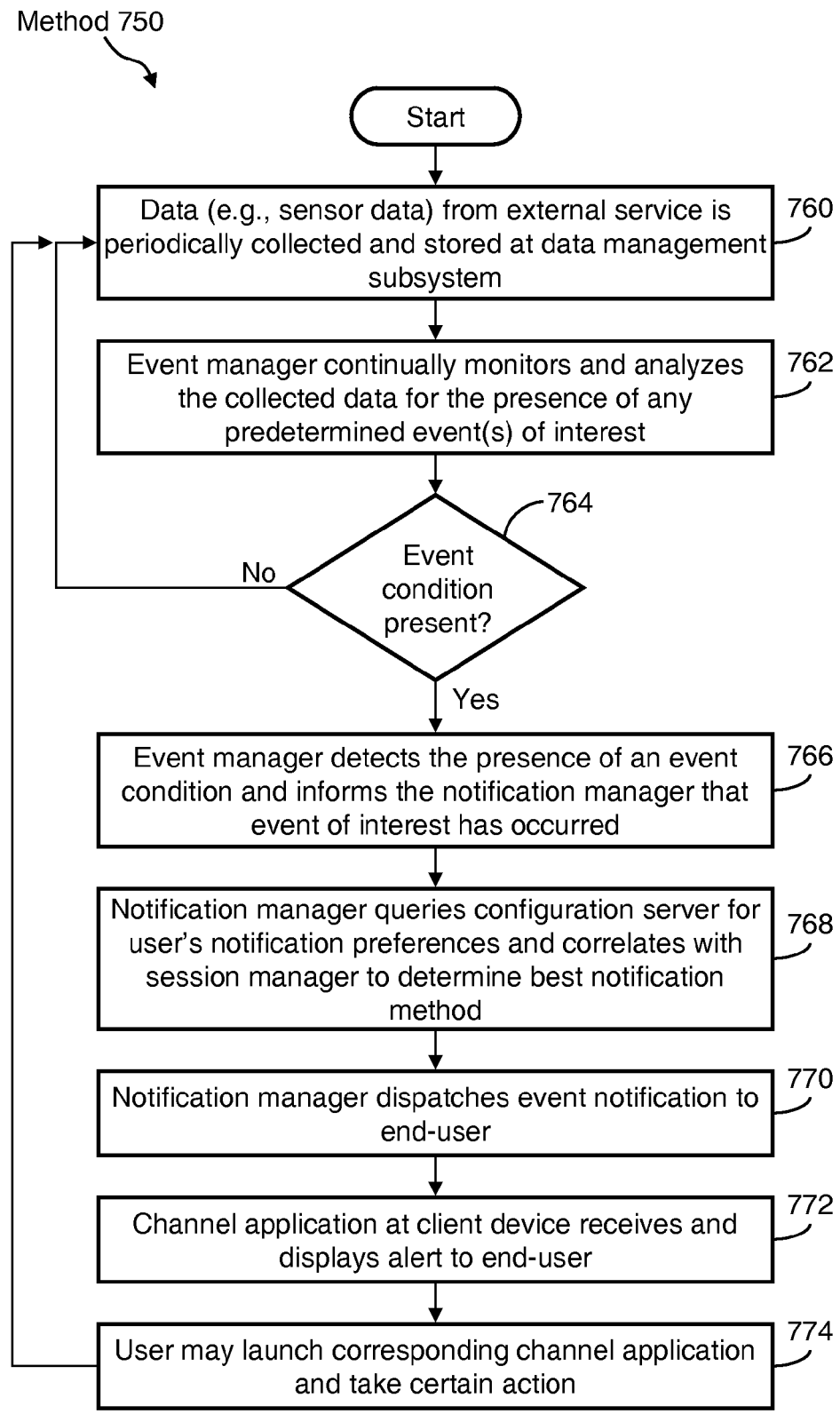
FIG. 7B illustrates a flow diagram of an example of a method of performing eventing and alerting using the personal information delivery application, according to one embodiment of the present invention.
Figure 8:
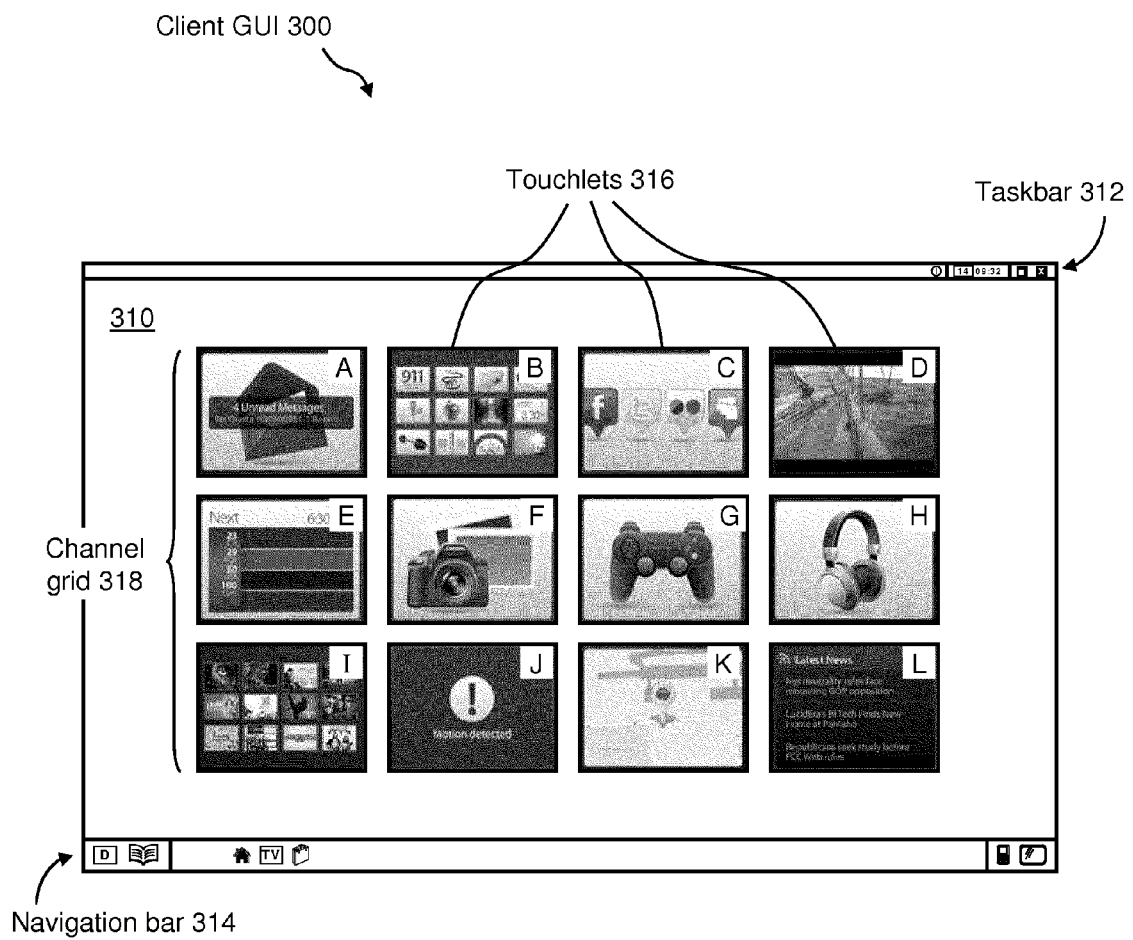
FIG. 8 illustrates a screenshot of the client GUI of the personal information delivery application that includes a "Home Security" touchlet, which is displaying an alert condition, according to one embodiment of the present invention.

Referring to FIG. 7B, a flow diagram of an example of a method 750 of performing eventing and alerting using PID application 112 is presented. Method 750 includes an example of an actionable alert. In this example, eventing and alerting may be based on that state of certain data (e.g., sensor data) that originates from a certain external information source 114. Further, the data may not persist at the source and, therefore, the ODS of data management subsystem 450 may be used to store a certain amount of data for processing. By way of example, method 750 is performing eventing and alerting based on sensor data of a home security system. Examples of sensor data of security systems may include, but are not limited to, door sensor data, window sensor data, motion sensor data, and/or smoke detector data. In this example, eventing operations of information delivery system 100 may be based on the home security system sensor data. According to the presence of a certain event, a corresponding alert may be transmitted to a user 116 via one or more of his/her user devices 118.

Figure 9:
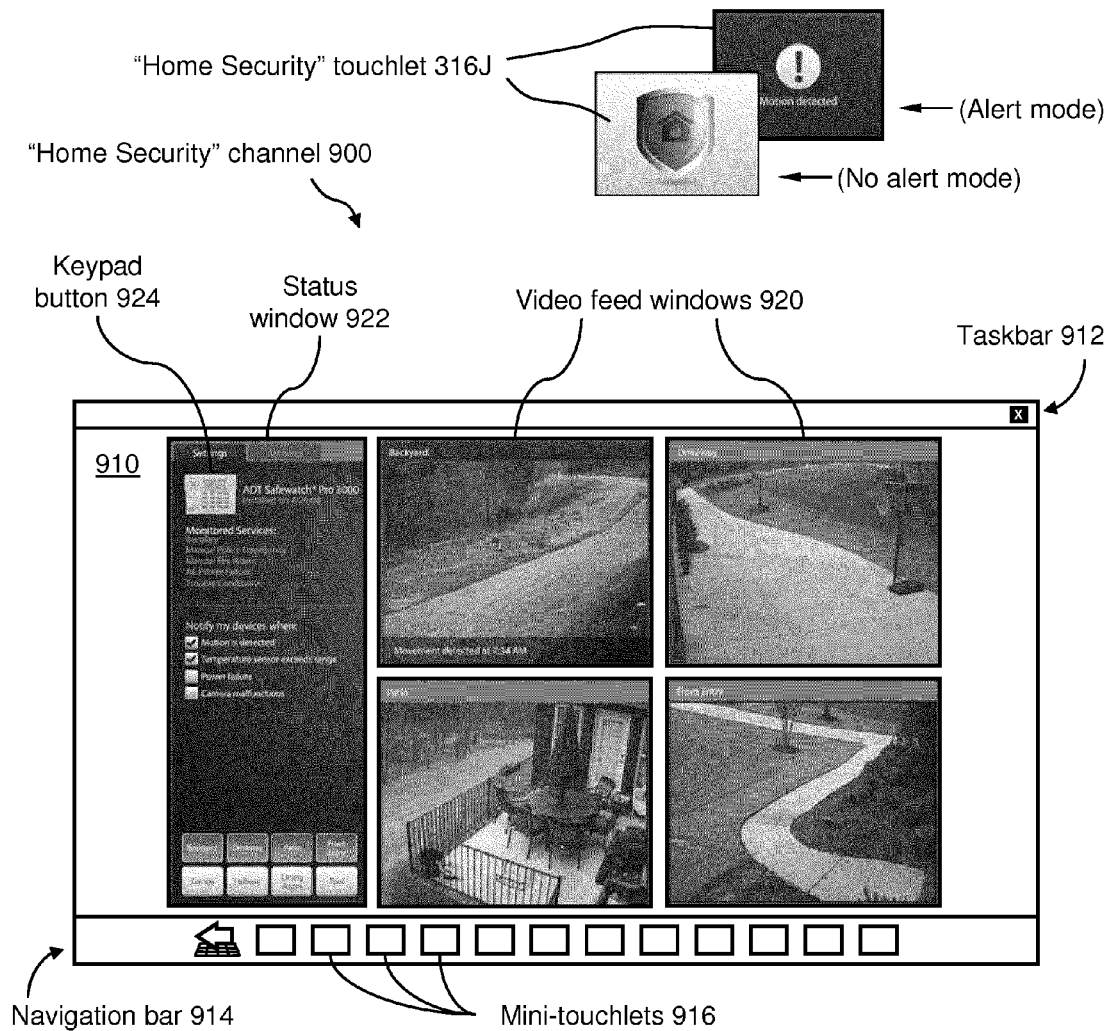
FIGS. 9 and 10 illustrate screenshots of certain components of an example of a "Home Security" channel by which a user may take action based on an alert that is received, according to one embodiment of the present invention.

A "Home Security" touchlet 316J of channel grid 318 of client GUI 300 of FIG. 3 is an example of a touchlet that is associated with a "Home Security" channel 900 (shown in FIG. 9). Touchlet 316J may be used to convey certain dynamic, near real-time information to the user 116 about a home security system. Using the example of eventing and alerting based on information of a home security system, method 750 of FIG. 7B may include, but is not limited to, the following steps.

At step 760, data (e.g., sensor data) from an external service is periodically or continuously collected and stored at data management subsystem 450. Using the example of a home security system, a service of, for example, the "Home Security" channel 900 interrogates the data from the external application of the home security service provider. For example and referring to FIG. 6, this interrogation of the external home security service provider is performed across enterprise service bus 480 using a certain adaptor 482, such as a REST adaptor. In this example, door sensor data, window sensor data, motion sensor data, and/or smoke detector data is periodically requested (e.g., every 5 minutes) form the external home security service. Accordingly, the data is collected and stored in the ODS of data management subsystem 450 for display to the user 116 via his/her user device 118 and/or for performing eventing and alerting operations.

At step 762, the event manager continually monitors the collected data for the presence of any predetermined event(s) of interest. Continuing the example of the "Home Security" channel 900, the predetermined event(s) of interest for which the user 116 wishes to be notified (i.e., alerted) may be, for example, any triggering of a door sensor, window sensor, motion sensor, smoke detector, and any combinations thereof. Referring again to FIG. 6, the event manager of the eventing and alerting subsystem 452 uses CEP (e.g., via CQL programming) to continually monitor the ODS of data management subsystem 450 based on event(s) that have been set.

Referring to FIG. 3, the "Home Security" touchlet 316J of channel grid 318 of client GUI 300 is shown in a non-alert state. In this example, the non-alert state of the "Home Security" channel 900 is indicated by a green shield symbol displayed in the "Home Security" touchlet 316J.

At decision step 764, referring again to FIG. 6, the event manager of the eventing and alerting subsystem 452 determines whether an event condition is present. That is, the event manager of the eventing and alerting subsystem 452 determines whether any condition is present that corresponds to any of the predetermined event(s) of interest for which an alert is to be generated. If the event manager detects an event condition is present, method 750 may proceed, for example, to step 766. However, if the event manager detects no event condition is present, method 750 may return, for example, to step 760.

At step 766, referring again to FIG. 6, the event manager of the eventing and alerting subsystem 452 detects the presence of an event condition and informs the notification manager of the eventing and alerting subsystem 452 that an event of interest has occurred. Continuing the example of the "Home Security" channel 900, in one example, the event manager is monitoring the motion detector data at the ODS and detects that a motion detector at the user 116's home has been triggered. Therefore, the event manager of the eventing and alerting subsystem informs the notification manager of the eventing and alerting subsystem 452 of "motion detected."

At step 768, referring again to FIG. 6, the notification manager of the eventing and alerting subsystem 452 queries the configuration server 454 for the user's notification preferences and correlates these notification preferences with session manager 456 to determine the best notification method. That is, the notification manager queries the configuration server 454 and determines, for example, that the user has certain online notification preferences and certain offline notification preferences. If online, notify by, for example, the user's active session. If offline, notify by, for example, a txt message, call the user's landline, call a friend of the user, and the like. Additionally, notifications may be based on user identity, user role, user location, time, date, and the like.

The notification manager of the eventing and alerting subsystem 452 then queries session manager 456 to determine the user's connectedness. For example, it is determined whether the user 116 has an active session as well as any other special conditions, such as, but not limited to, user role, user location, time, date, and the like. In one example, it is determined that the user 116 has an active session on his/her laptop computer, which is one user device 118. As a result, it is determined that the best alert notification method is via the laptop computer of the user 116.

At step 770, referring again to FIG. 6, the notification manager of the eventing and alerting subsystem 452 dispatches the event notification (i.e., alert) through user's logical event queue. For example, the client gateway 418 of the facilitation server 416 transmits (via AMF) the alert to one or more user devices 118. Continuing the example, the alert is transmitted to the laptop computer of the user 116.

At step 772, referring again to FIG. 6, the channel application at the client device (e.g., user device 118) receives and displays the alert to the user 116. Continuing the example, the "Home Security" channel 900 continually monitors the client bus 560 and, thereby, receives and displays the event notification (i.e., alert) to the user 116. For example, the visual components of the associated touchlet may transition from a non-alert state to an alert state. In this example, and referring to FIG. 8, a screenshot of client GUI 300 of PID application 112 is presented in which the "Home Security" touchlet 316J is shown in an alert state. In this example, the alert state of the "Home Security" channel 900 is indicated by the "Home Security" touchlet 316J turning red and displaying a "Motion detected" message.

At step 774, the user 116 may launch the corresponding channel application and take certain action. Continuing the example, the user 116 may touch/click on the "Home Security" touchlet 316J that is indicating the alert and, thereby, launch the corresponding "Home Security" channel 900, as shown in FIGS. 9 and 10.

Figure 10:
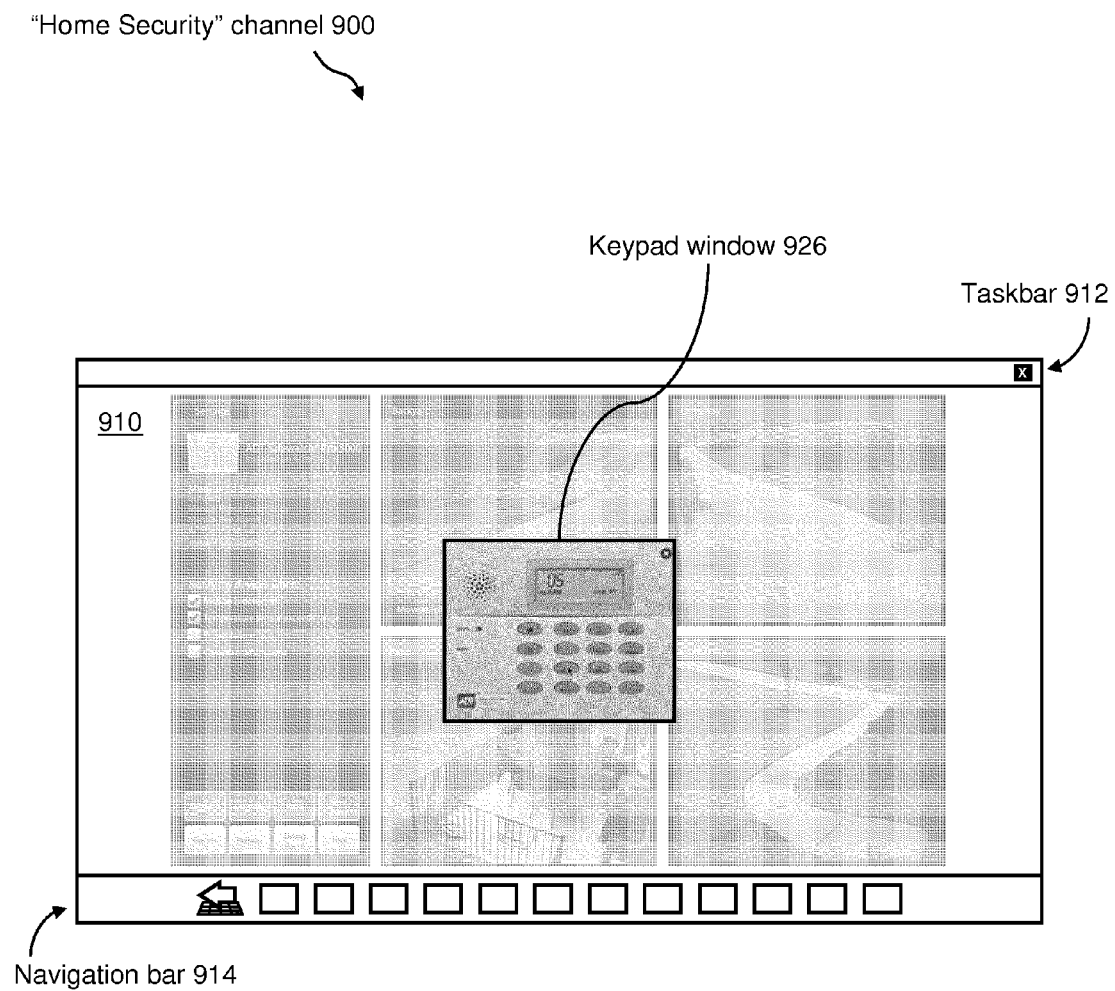

Referring to FIGS. 9 and 10, screenshots of certain components of an example of "Home Security" channel 900 are presented, by which a user may take action based on an alert that is received. FIGS. 9 and 10 show "Home Security" channel 900 operating in a substantially full-screen mode. "Home Security" touchlet 316J is provided for presenting dynamic information of, interacting with, and/or launching "Home Security" channel 900. "Home Security" channel 900 provides a mechanism for monitoring and/or reporting information about the user 116's home security system, which is supported by a home security service provider that is accessible via PID application architecture 400 of information delivery system 100.

The display of "Home Security" channel 900 may include, for example, a main viewing panel 910. Additionally, a taskbar 912 may be provided along the top of main viewing panel 910 and a navigation bar 914 may be provided along the bottom of main viewing panel 910. Navigation bar 914 may include, for example, a set of mini-touchlets 916, which are substantially the same as, for example, touchlets 316 of channel grid 318 of FIG. 8 but presented in miniature form. A user may navigate directly to any channel application by selecting one of the mini-touchlets 916.

The display of "Home Security" channel 900 may include, for example, one or more video feed windows 920 and a status window 922. In this example, four video feeds from four cameras in four respective locations in the user's home are presented in video feed windows 920. The video feed that is related to a particular alert condition may be color coded to stand out to the viewer. For example, FIG. 9 shows the video feed window 920 of the backyard is highlighted in red, while the others are not highlighted in red. The status window 922 shows in text form any alert conditions that are present as well as any other useful control buttons. For example, a keypad button 924 may be provided for launching a keypad window 926, as shown in FIG. 10.

The keypad window 926 substantially mimics the physical keypad in the user's home and provides a mechanism by which the user may interact remotely with his/her home security system via any user device 118. This is an example of channels 200 of PID application 112 providing users the ability to take action upon receiving an alert. That is, PID application 112 provides actionable eventing and alerting capability. For example, by viewing the video feed, the user 116 may determine that the motion detected was caused by an animal in his/her backyard. Therefore, the user 116 may use keypad window 926 to clear the alert condition.

Figure 11:
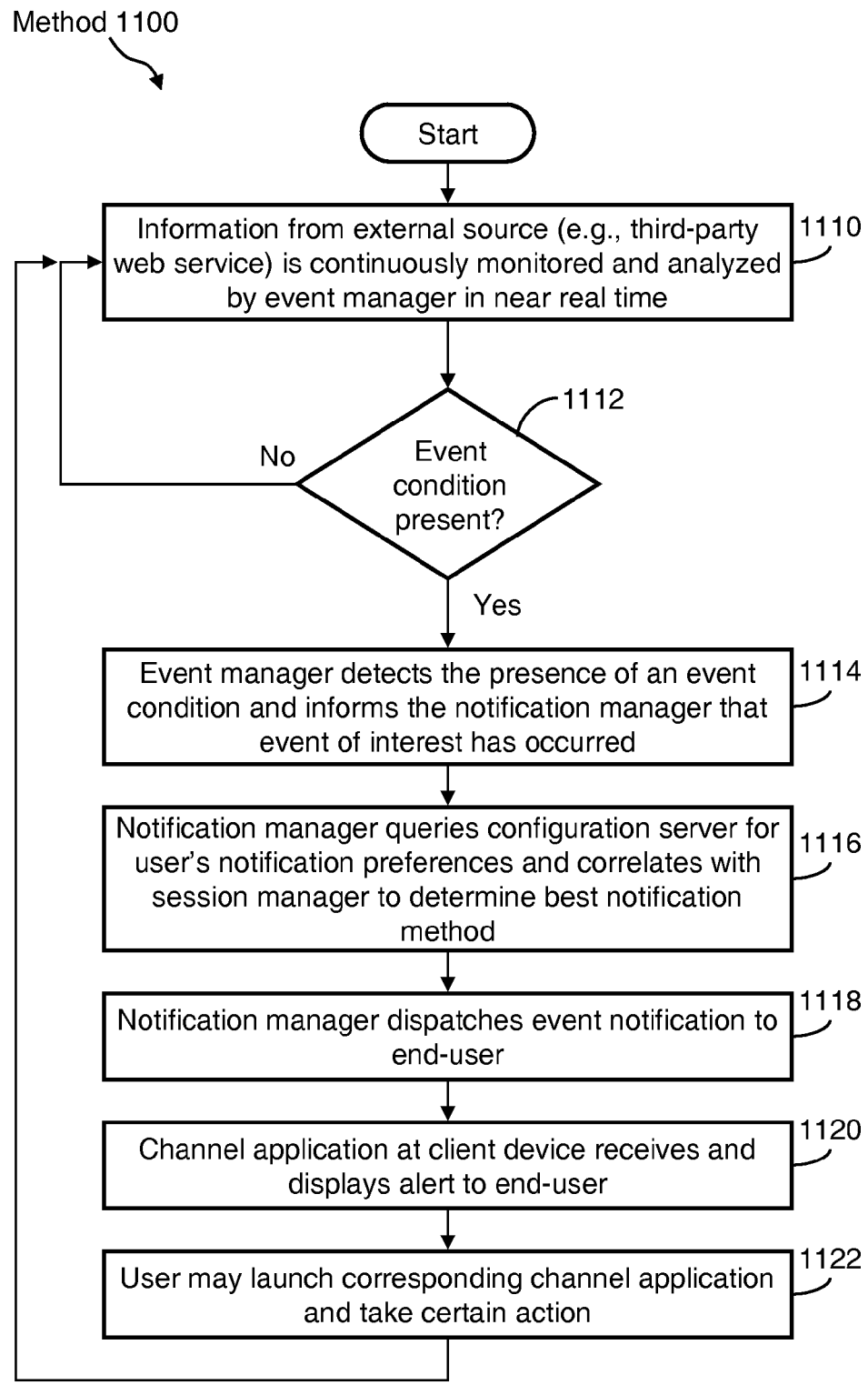
FIG. 11 illustrates a flow diagram of another example of a method of performing eventing and alerting using the personal information delivery application, according to one embodiment of the present invention.

Referring to FIG. 11, a flow diagram of another example of a method 1100 of performing eventing and alerting using PID application 112 is presented. Method 1100 includes an example of an actionable alert. In this example, the eventing and alerting process may be based on the direct query of another external system instead of monitoring data that is collected and stored in the ODS of data management subsystem 450.

By way of example, method 1100 is performing eventing and alerting based on near real-time currency and foreign exchange data of, for example, a currency trading system. In this example, eventing operations of information delivery system 100 may be based, for example, on the direct query of the currency trading system and the detection of one or more exchange rates at which the user wishes to be alerted via one or more of his/her user devices 118. Method 1100 may include, but is not limited to, the following steps.

At step 1110, information from an external source (e.g., third-party web service) is continuously monitored and analyzed by the event manager in near real time. Continuing the example of the currency trading system, an example of a predetermined event of interest for which the user 116 wishes to be notified (i.e., alerted) may be when 1 Euro is equal to 1.3 U.S. dollars or less (i.e., 1 EUR=1.3 USD or less). Referring again to FIG. 6, the event manager of the eventing and alerting subsystem 452 uses CEP (e.g., via complex query language (CQL) programming) to continually monitor the currency and foreign exchange data of the currency trading system based on event(s) that have been set.

For example and referring to FIG. 6, the direct query of the external currency trading system is performed across enterprise service bus 480 using a certain adaptor 482, such as a REST adaptor. In this example, currency and foreign exchange data is may be pushed form the external currency trading system in near real time to the requesting "Currency Trading" channel (not shown). Accordingly, the currency and foreign exchange data may be displayed in near real time to the user 116 via his/her user device 118 and/or analyzed in near real time for performing eventing and alerting operations.

At decision step 1112, referring again to FIG. 6, the event manager of the eventing and alerting subsystem 452 determines whether an event condition is present. That is, the event manager of the eventing and alerting subsystem 452 determines whether any condition is present that corresponds to any of the predetermined event(s) of interest for which an alert is to be generated. If the event manager detects an event condition is present, method 1100 may proceed, for example, to step 1114. However, if the event manager detects no event condition is present, method 1100 may return, for example, to step 1110.

At step 1114, referring again to FIG. 6, the event manager of the eventing and alerting subsystem 452 detects the presence of an event condition and informs the notification manager of the eventing and alerting subsystem 452 that an event of interest has occurred. Continuing the example of the currency trading system, in one example, the event manager is monitoring whether 1 Euro is equal to 1.3 U.S. dollars or less and detects that currently 1 EUR=1.29 USD and, thus, the condition of 1 EUR=1.3 USD or less is met. Therefore, the event manager of the eventing and alerting subsystem informs the notification manager of the eventing and alerting subsystem 452 of "Exchange rate met."

At step 1116, referring again to FIG. 6, the notification manager of the eventing and alerting subsystem 452 queries the configuration server 454 for the user's notification preferences and correlates these notification preferences with session manager 456 to determine the best notification method. That is, the notification manager queries the configuration server 454 and determines, for example, that the user has certain online notification preferences and certain offline notification preferences. If online, notify by, for example, the user's active session. If offline, notify by, for example, a txt message, call the user's landline, call a friend of the user, and the like. Additionally, notifications may be based on user identity, user role, user location, time, date, and the like.

The notification manager of the eventing and alerting subsystem 452 then queries session manager 456 to determine the user's connectedness. For example, it is determined whether the user 116 has an active session as well as any other special conditions, such as, but not limited to, user role, user location, time, date, and the like. In one example, it is determined that the user 116 has an active session on his/her laptop computer, which is one user device 118. As a result, it is determined that the best alert notification method is via the laptop computer of the user 116.

At step 1118, referring again to FIG. 6, the notification manager of the eventing and alerting subsystem 452 dispatches the event notification (i.e., alert) through user's logical event queue. For example, the client gateway 418 of the facilitation server 416 transmits (via AMF) the alert to one or more user devices 118. Continuing the example, the alert is transmitted to the laptop computer of the user 116.

At step 1120, referring again to FIG. 6, the "Currency Trading" channel at the client device (e.g., user device 118) receives and displays the alert to the user 116. Continuing the example, the requesting the "Currency Trading" channel continually monitors the client bus 560 and, thereby, receives and displays the event notification (i.e., alert) to the user 116. For example, the visual components of a "Currency Trading" touchlet (not shown) may transition from a non-alert state to an alert state. In one example, the color of the touchlet may change from green to red when 1 Euro is equal to 1.3 U.S. dollars or less (i.e., 1 EUR=1.3 USD or less). Further, a certain text message may be displayed in the "Currency Trading" touchlet, such as "Exchange rate=1.3 or less."

At step 1122, the user 116 may launch the corresponding channel application and take certain action. Continuing the example, the user 116 may touch/click on the "Currency Trading" touchlet (not shown) that is indicating the alert and, thereby, launch the corresponding "Currency Trading" channel (not shown) that allows the user to perform any desired transactions.

Figure 12:
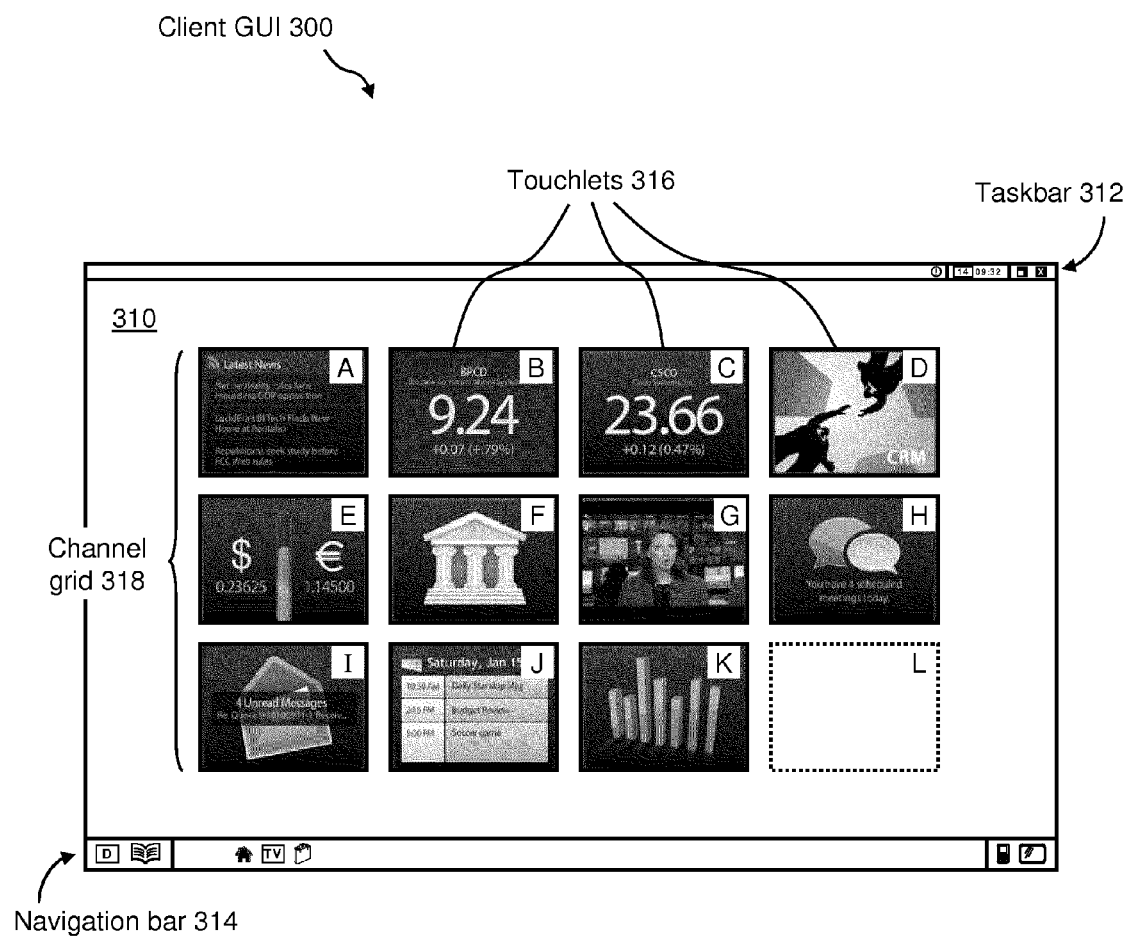
FIG. 12 illustrates a screenshot of an example of the client GUI that includes another example of a channel grid, according to one embodiment of the present invention.

Referring to FIG. 12, a screenshot of client GUI 300 that includes another example of a channel grid 318 is presented. In this example, the channel grid 318 may be, for example, the user's "At Work" channel grid. This channel grid 318 includes, for example, eleven touchlets 316 (touchlets 316A through 316K), with one channel grid location empty (e.g., touchlet 316L). Touchlet 316B is a "Stock Watch" touchlet that is associated with a "Stock Watch" channel (e.g., "Stock Watch" channel 1300 of FIG. 13). The "Stock Watch" channel may provide a mechanism by which a user 116 may monitor a certain company's stock and/or financial information. In this example, the "Stock Watch" channel is monitoring the stock and/or financial information of Brocade Communications Systems, Inc (BRCD).

Figure 13:
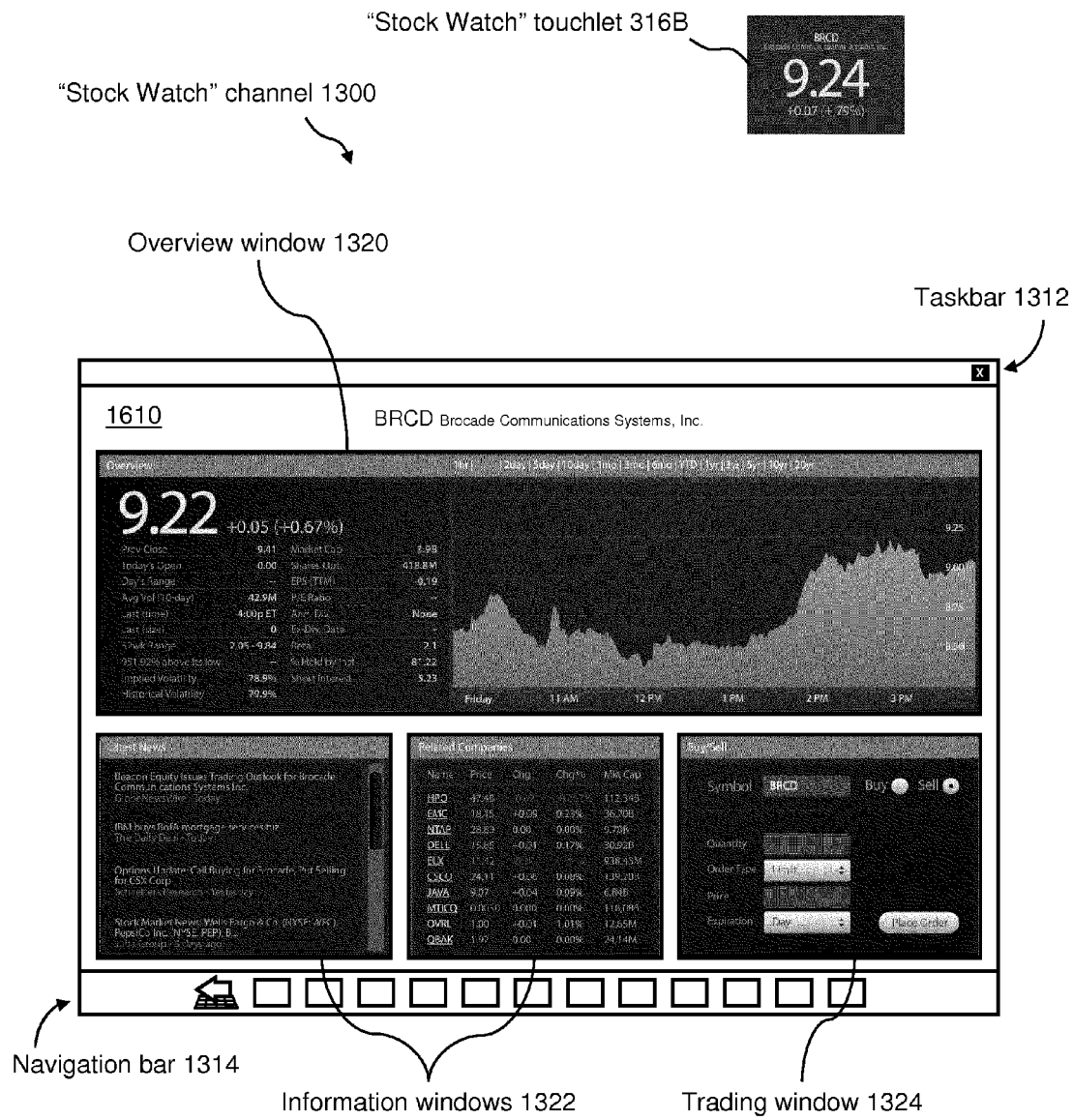
FIG. 13 illustrates screenshots of certain components of an example of a "Stock Watch" channel of the personal information delivery application, according to one embodiment of the present invention.

Referring to FIG. 13, screenshots of certain components of an example of a "Stock Watch" channel 1300 of PID application 112 is presented. FIG. 13 shows "Stock Watch" channel 1300 operating in a substantially full-screen mode. "Stock Watch" touchlet 316B is provided for presenting dynamic information of, interacting with, and/or launching "Stock Watch" channel 1300. "Stock Watch" channel 1300 provides a mechanism for monitoring and/or reporting certain stock and/or financial information of a company of interest. In this example, "Stock Watch" channel 1300 is monitoring Brocade Communications Systems, Inc (BRCD).

The display of the "Stock Watch" channel 1300 may include, for example, a main viewing panel 1310. Additionally, a taskbar 1312 may be provided along the top of main viewing panel 1310 and a navigation bar 1314 may be provided along the bottom of main viewing panel 1310. The display of "Stock Watch" channel 1300 may include, for example, an overview window 1320, one or more information windows 1322, and a trading window 1324.

In this example, overview window 1320 shows a plot of the BRCD stock price over some selectable period of time (e.g., last hour, day, week, month, etc), as well as other statistical information about the BRCD stock. FIG. 13 shows two information windows 1322. For example, one information window 1322 displays information about the latest news. The other information window 1322 displays stock information about certain other companies (i.e., companies related to BRCD in some manner). Trading window 1324 provides mechanisms by which the user 116 may perform stock trading transactions (e.g., buying and selling stock).

The "Stock Watch" channel 1300 is a good example of a channel application that to the user is seemingly a single application, but is in fact pulling publicly available information from multiple disparate data sources. For example, the real-time stock price display information in "Stock Watch" touchlet 316B and in the overview window 1320 may originate from the "Yahoo! Finance" web service, the related companies display information in an information window 1322 may also originate from the "Yahoo! Finance" web service, the plot and other statistical information in the overview window 1320 may originate from the "The Motley Fool" web service, and the "Latest News" information in an information window 1322 may originate from the "Google Finance" web service, trading window 1324 may be supported by the "TD Ameritrade" web service, and the like.

Additionally, the functions of trading window 1324 is an example of using the single sign-on (or universal sign-on) capability of PID application 112. In this example, the user 116 is already authenticated at PID application 112. Therefore, the user 116 is not prompted for any further login credentials when using trading window 1324, which may be supported by an online trading web-service, such as, but not limited to, TD Ameritrade. In this example, the user's TD Ameritrade login information is already stored in the user's profile/configuration and is automatically provided as needed by any channel application of information delivery system 100. The capability of the single sign-on (or universal sign-on) feature is not limited to user login information, user banking and/or credit card information may also be stored in the user's profile/configuration. Additionally, the single sign-on (or universal sign-on) feature my include login credentials with respect to the user's different user devices 118. As a result, payments information may be automatically provided as needed. In the example of TD Ameritrade, any transactions performed via trading window 1324 are handled without prompting the user 116 for payments information. The aforementioned features of PID application 112 provide convenience to the user.

Referring to FIGS. 14 through 17, screenshots of client GUI 300 of PID application 112 and another example of a process of eventing and alerting using PID application 112 is presented. The eventing and alerting process shown in FIGS. 14 through 17 is one example of implementing method 750 of FIG. 7B and/or method 1100 of FIG. 11. In this example, with respect to "Stock Watch" touchlet 316B and "Stock Watch" channel 1300, the user 116 sets an alert for when the BRCD share price rises above a certain value, as follows.

Figure 14:
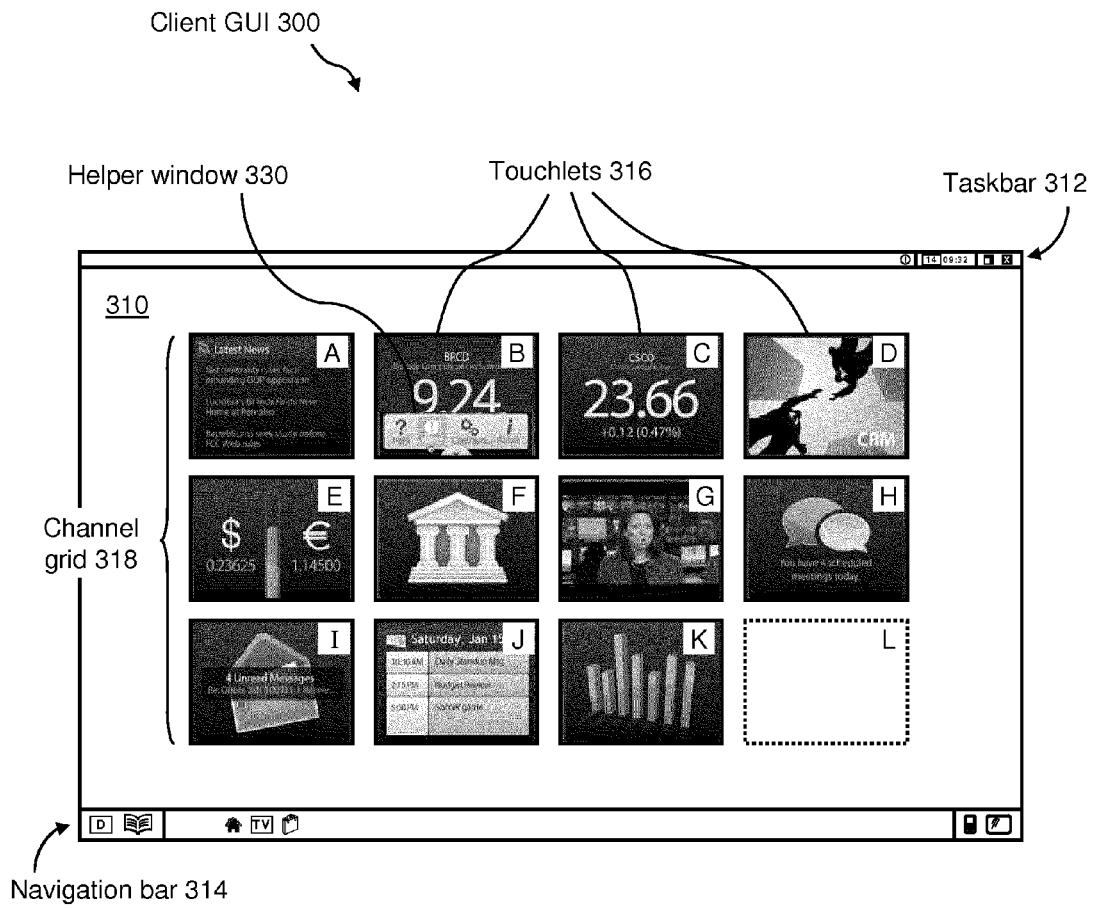
FIGS. 14 through 17 illustrate screenshots of a client GUI of the personal information delivery application another example of a process of eventing and alerting using the personal information delivery application, according to various embodiments of the present invention.
Figure 15:
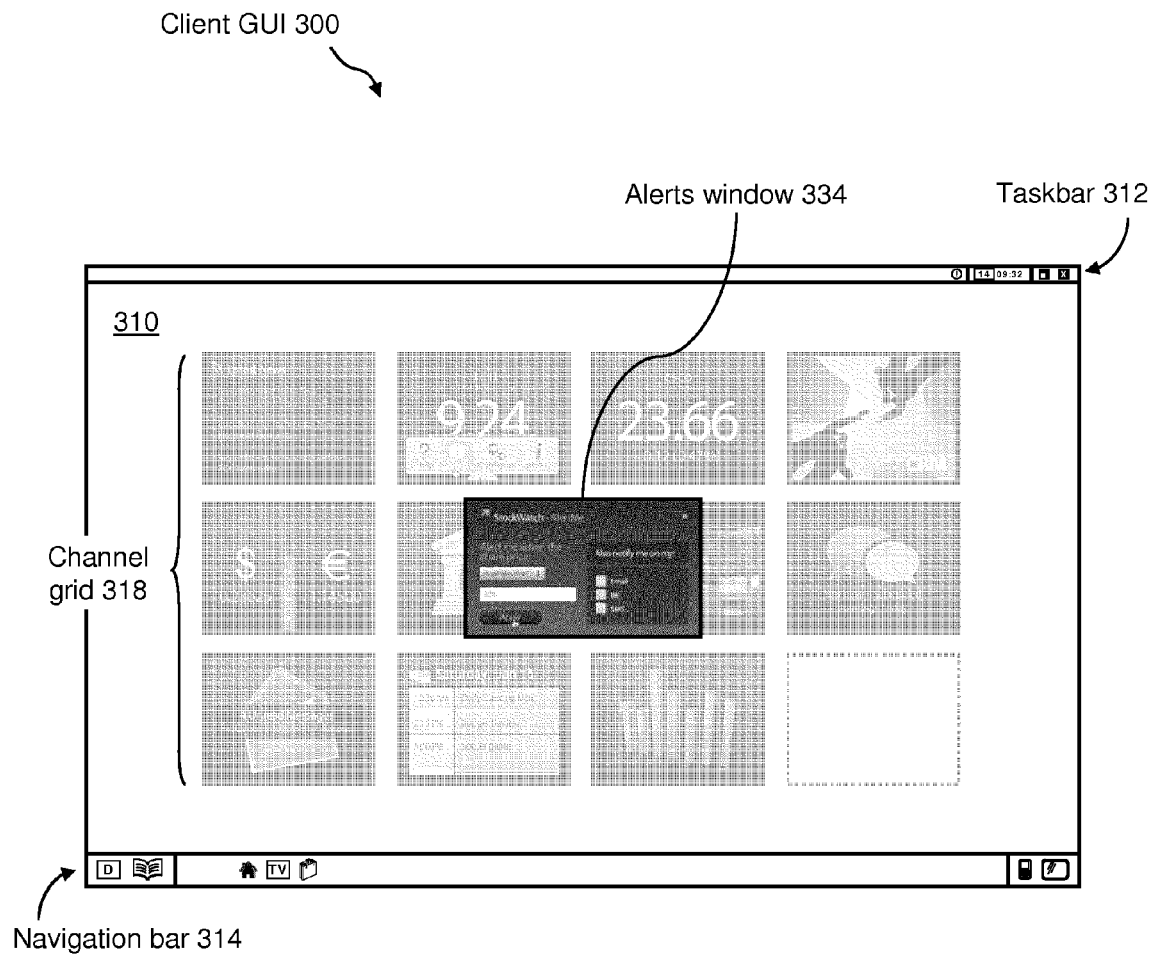

FIG. 14 shows that by hovering the mouse over the "Stock Watch" touchlet 316B, helper window 330 is displayed to the user 116. To set an alert with respect to "Stock Watch" touchlet 316B, the user selects the "Alerts" button. As a result of selecting the "Alerts" button of helper window 330, an alerts window 334 is displayed to the user 116, as shown in FIG. 15. Alerts window 334 provides a mechanism by which the user 116 may create an alert that is based, for example, on share price. The share price that the user enters is an example of a threshold condition or parameter for triggering an alert notification, which is an example of trigger information that may be stored in data management subsystem 450 in step 718 of method 700. As shown in FIG. 15, alerts window 334 provides an entry field for entering a share price.

Other controls are provided in alerts window 334 to generate the alert when the share price is "less than," "equal to," or "greater than" the share price that is entered. In one example, the user sets up an alert to occur when the share price is "less than" $9.23. To activate this eventing and alerting process, the user 116 may select an "Apply" button of alerts window 334, which closes the window and automatically registers the event in the event manager of the eventing and alerting subsystem 452 (see FIG. 6).

Figure 16:
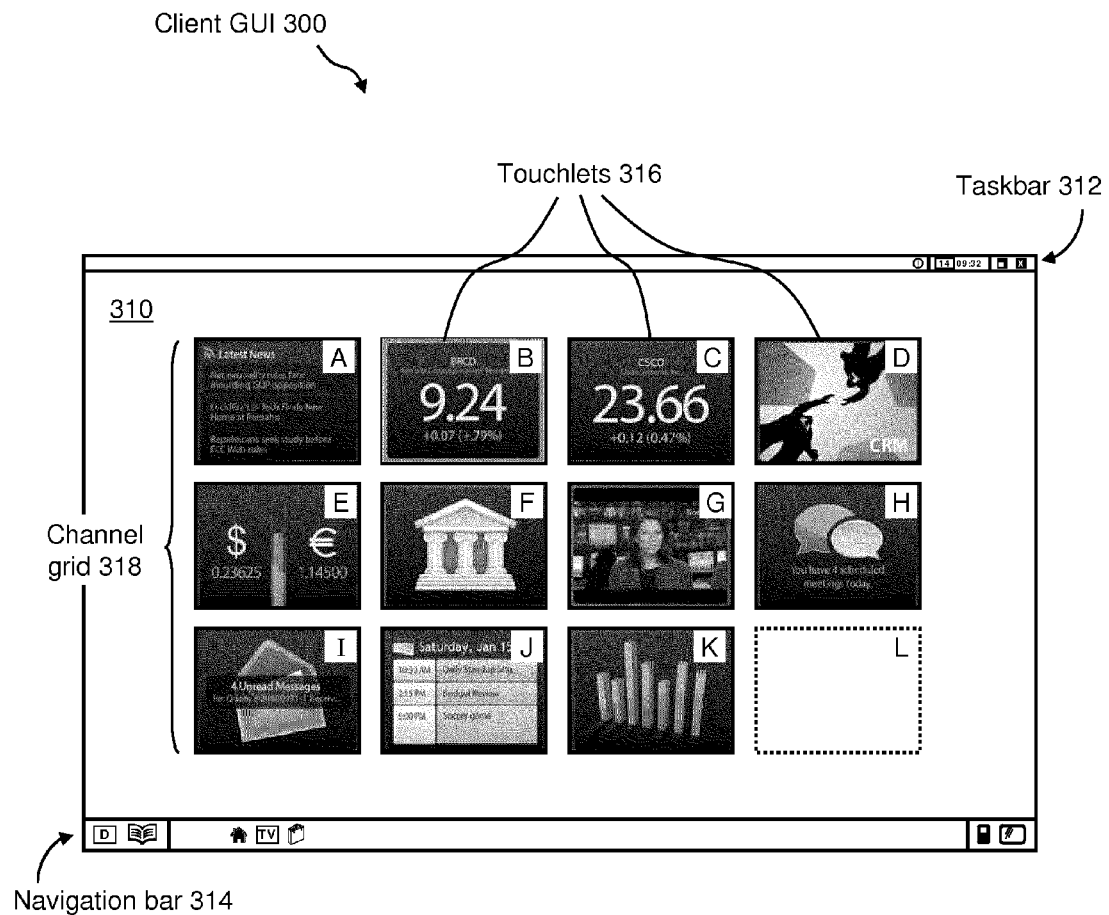
Figure 17:
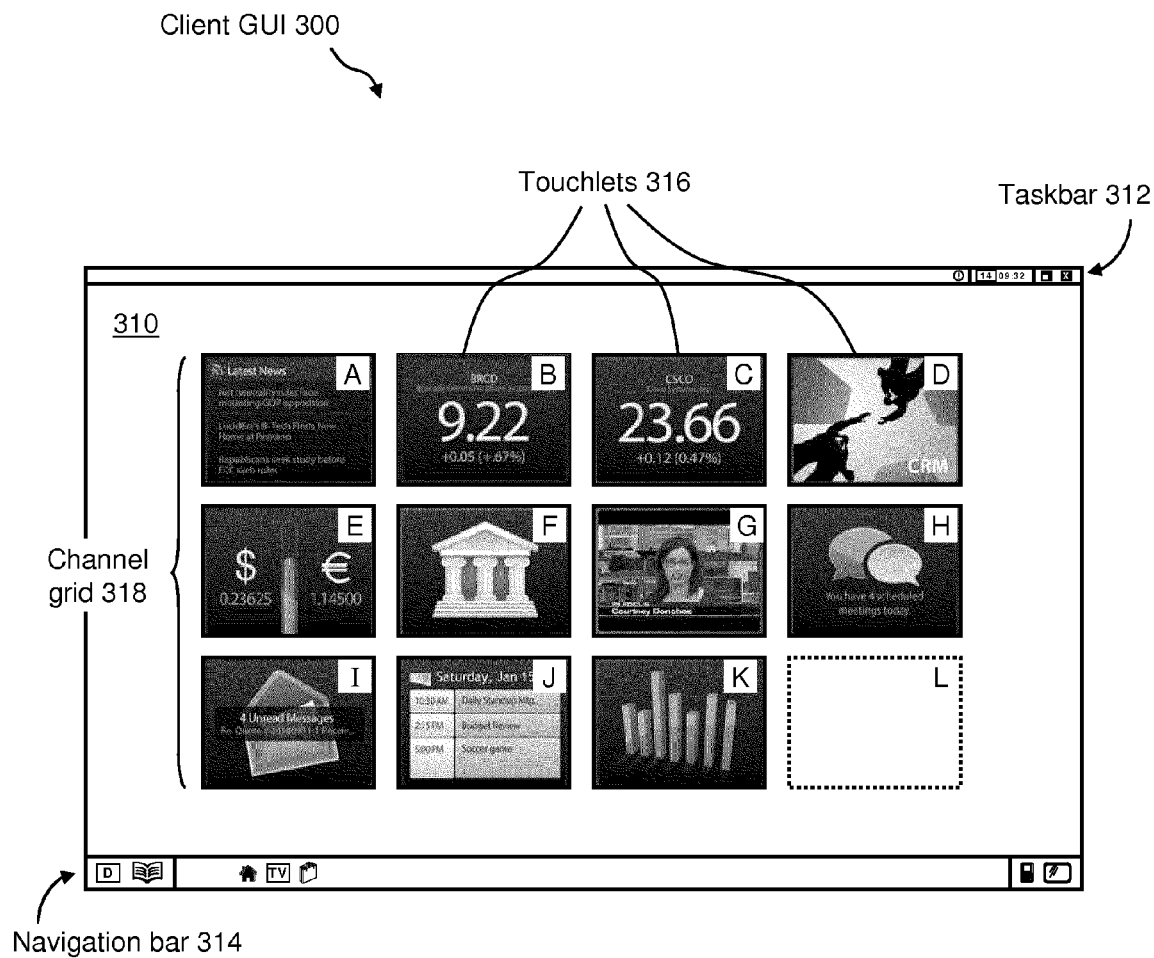

Accordingly, the event manager of the eventing and alerting subsystem 452 begins monitoring the data stream associated, in this example, with the BRCD stock. FIGS. 16 and 17 show examples of the visual components for this eventing and alerting process. For example, the event manager of the eventing and alerting subsystem 452 monitors the BRCD data stream and when the BRCD share price is approaching the alert set point (e.g., near $9.23), FIG. 16 shows that the "Stock Watch" touchlet 316B may display a warning state to the user 116. An example of the warning state is to change the color of the border of the "Stock Watch" touchlet 316B from, for example, black to yellow. The event manager of the eventing and alerting subsystem 452 continues to monitor the BRCD data stream and when the BRCD share price is "less than" $9.23, FIG. 17 shows that the "Stock Watch" touchlet 316B may display an alert state to the user 116. An example of the alert state is to change the color of the border of the "Stock Watch" touchlet 316B to red.

As described in method 750 of FIG. 7B and/or method 1100 of FIG. 11, in this example, the alert is delivered according to the user's configuration (notification preferences) and session. In summary, the event manager registers the event; the event manager monitors the bus, using CEP and CQL the event manager recognizes a certain condition is present; the notification manager checks the user's configuration and session; once it is determined how to notify the end-user the notification is pushed through the facilitation manager gateway (using AMF) and to the user device (client device); the client device is monitoring the client bus and receives the notification; and the notification is displayed to the user on the client device (e.g., yellow border, red border).

Referring to FIGS. 18 through 25, screenshots of certain channels of PID application 112 and an example of a process of combining two or more independent channels to create a new channel (and touchlet) and a process of eventing off of the combined data is presented. In this example, a user 116 may be a stock broker that hears that Cisco Systems, Inc is interested in buying Brocade Communications Systems, Inc. Therefore, there may be some very specific information that the user 116 wishes to be informed about regarding this potential transaction. Therefore, the user 116 may create a new channel and set up the desired alert notifications, as follows.

In this example, the process is using the "Latest News" touchlet 316A; the "Stock Watch" touchlet 316B, which is BRCD; and the "Stock Watch" touchlet 316C, which is Cisco Systems, Inc (CSCO); which are shown in FIG. 17. That is, in this example the independent channels supporting "Latest News" touchlet 316A, "Stock Watch" touchlet 316B, and "Stock Watch" touchlet 316C are combined to create a new channel (and touchlet). Then, an eventing and alerting process with respect to the new channel is set up with respect to the combined data.

Figure 18:
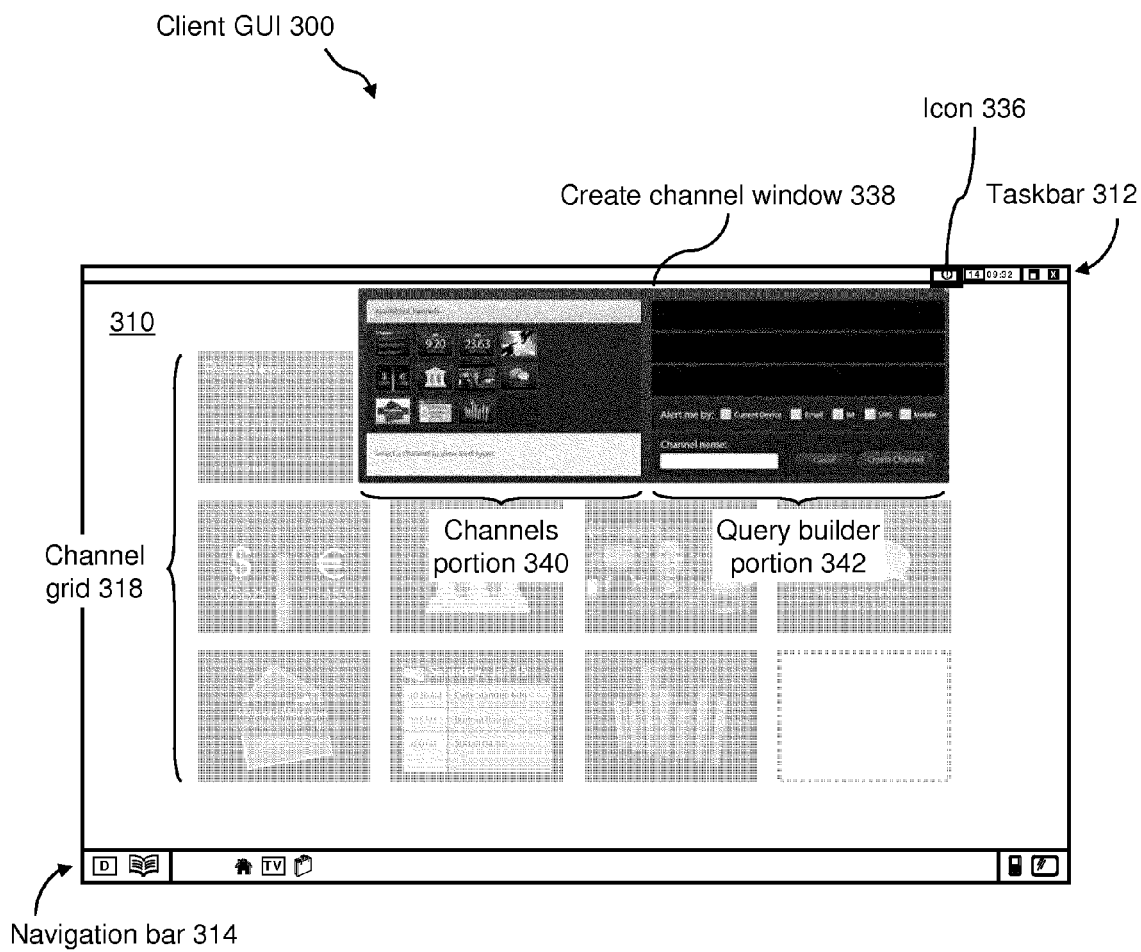
FIGS. 18 through 25 illustrate screenshots of certain channels of the personal information delivery application and an example of a process of combining two or more independent channels to create a new channel (and touchlet) and a process of eventing off of the combined data, according to various embodiments of the present invention.

Referring to FIG. 18, in order to create a new channel, the user 116 selects an icon 336 on taskbar 312, which causes a create channel window 338 to be displayed to the user 116. A channels portion 340 of the create channel window 338 shows a list of available channels from which to build an alert. For example, the available channels are from the current channel grid 318 or from any other channel grid of the user 116. A query builder portion 342 of the create channel window 338 provides a query builder function to the user 116, which is used to generate the CQL that interacts with the event manager of the eventing and alerting subsystem 452 (see FIG. 6).

Figure 19:
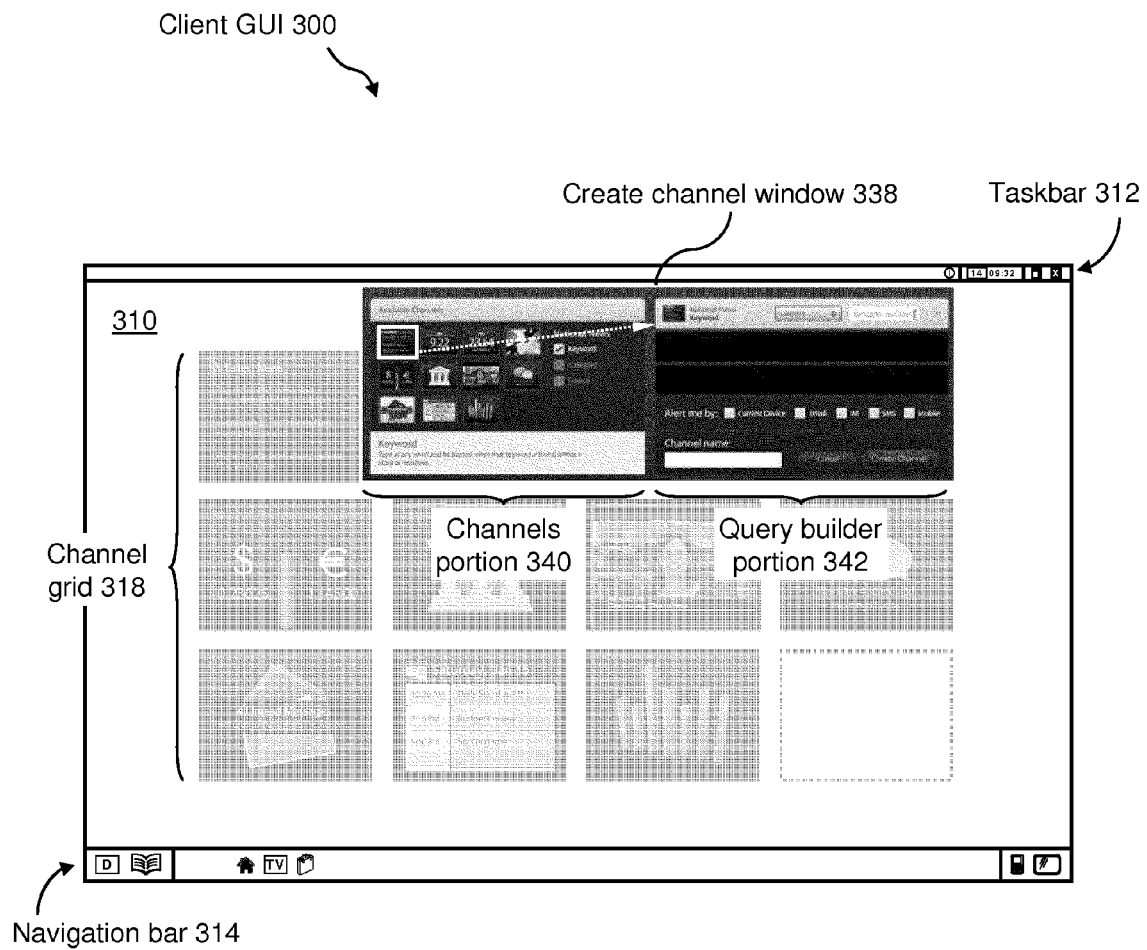

FIG. 19 shows that the user 116 may select a first channel, such as the "Latest News" channel from the channels portion 340, which causes the "Latest News" channel to appear in the query builder portion 342 of the create channel window 338. When a channel is designed, the developer exposes certain things that may be useful to users 116. In the case of the "Latest News" channel, a "keywords" field is provided to the user. User 116 enters, for example, the words "Brocade" and "Cisco." Once the channel is deployed, the news information of the "Latest News" channel is monitored for the words "Brocade" and "Cisco" (together in the same news feed) by the event manager of the eventing and alerting subsystem 452.

Figure 20:
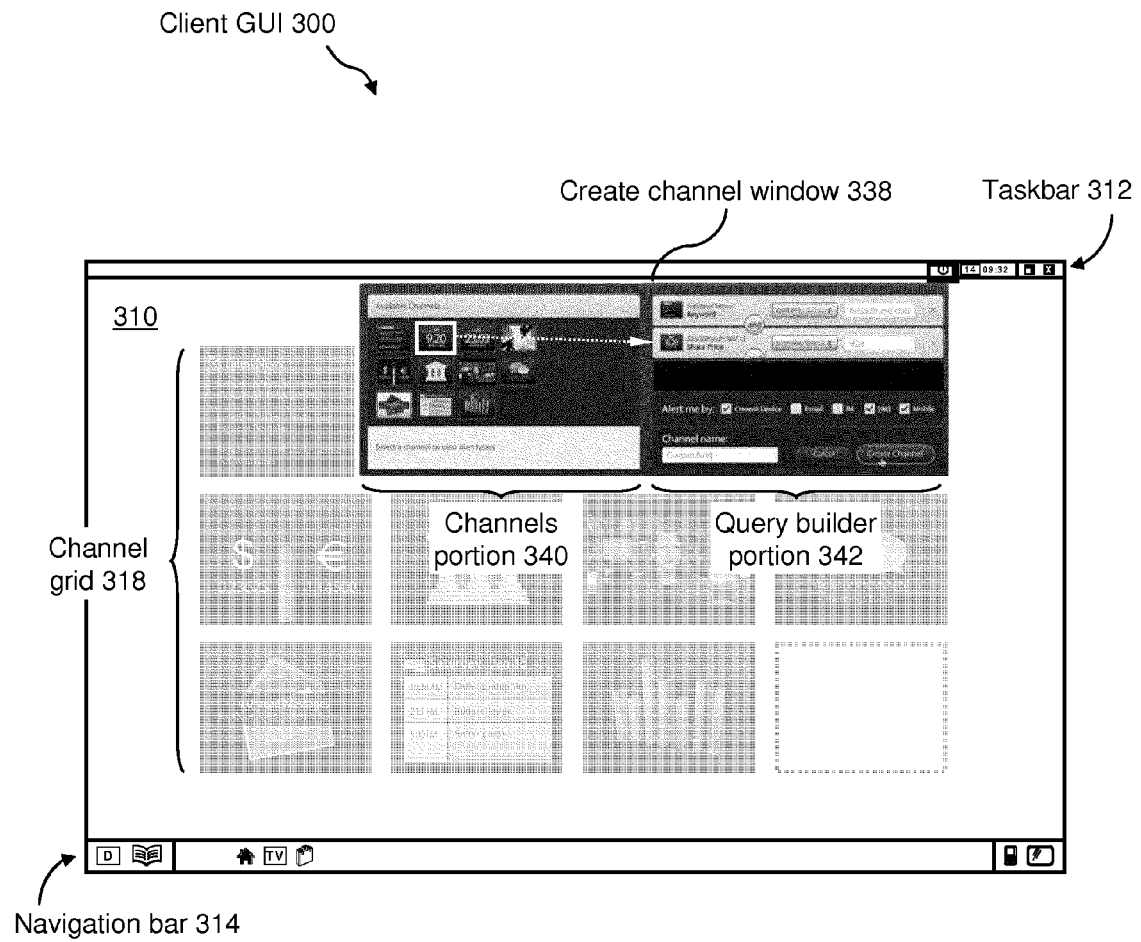

FIG. 20 shows that the user 116 may select a second channel, such as the BRCD "Stock Watch" channel from the channels portion 340, which causes the BRCD "Stock Watch" channel to also appear in the query builder portion 342 of the create channel window 338. Now two channels are present in the query builder portion 342. Again, when a channel is designed, the developer exposes certain things that may be useful to users 116. In the case of the "Stock Watch" channel, a "share price" field is provided to the user along with a qualifiers dropdown menu (greater than, equal to, less than). User 116 selects, for example, a share price "greater than $9.26." Once the channel is deployed, the share price information of the BRCD "Stock Watch" channel is monitored for this condition by the event manager of the eventing and alerting subsystem 452. The information that the user enters in the query builder portion 342 of the create channel window 338 is an example of threshold conditions or parameters for triggering an alert notification, which is another example of trigger information that may be stored in data management subsystem 450 in step 718 of method 700.

Figure 21:
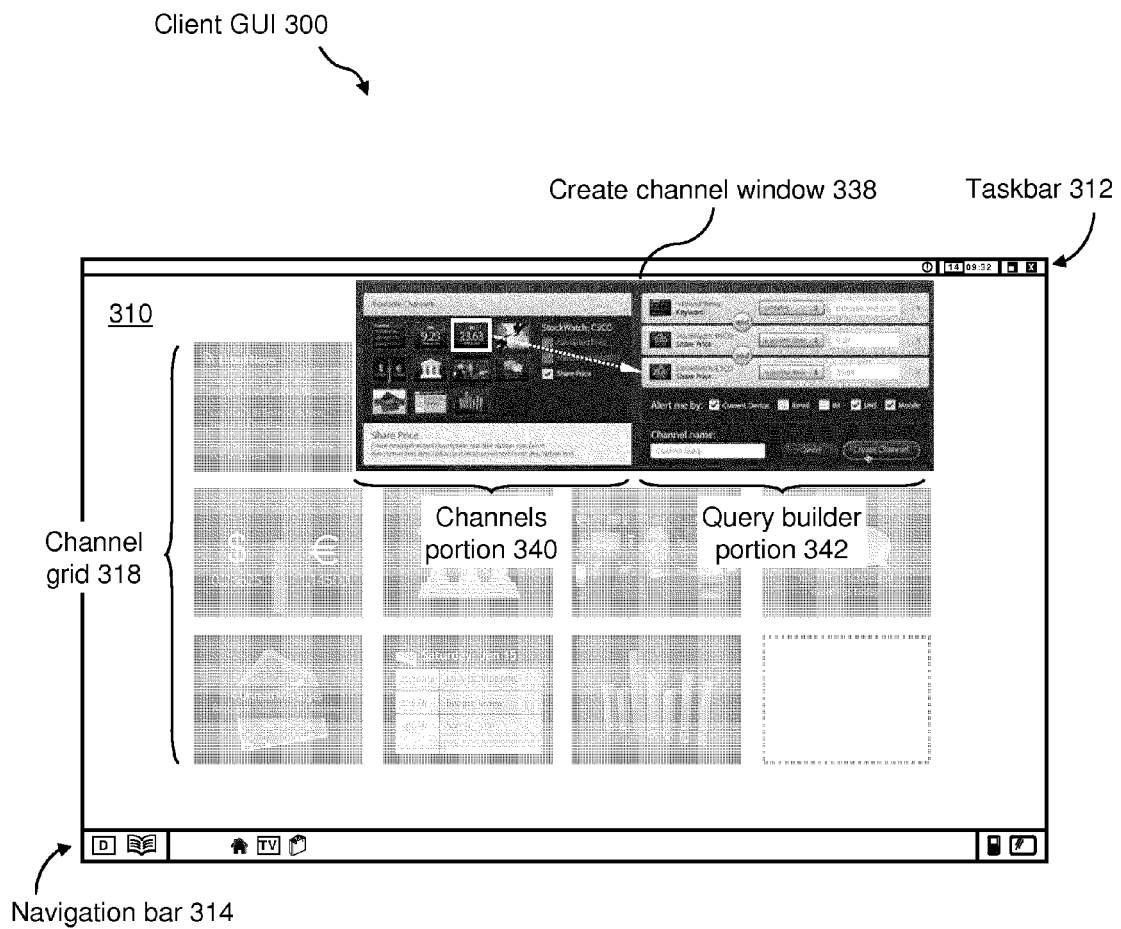

FIG. 21 shows that the user 116 may select a third channel, such as the CSCO "Stock Watch" channel from the channels portion 340, which causes the CSCO "Stock Watch" channel to also appear in the query builder portion 342 of the create channel window 338. Now three channels are present in the query builder portion 342. User 116 selects, for example, a share price "greater than $23.63." Once the channel is deployed, the share price information of the CSCO "Stock Watch" channel is monitored for this condition by the event manager of the eventing and alerting subsystem 452.

The query builder portion 342 of the create channel window 338 allows boolean operations between the selected channels. For example, the user 116 may be provided AND, OR, ANDNOT, and XOR functions. In this example, the user selects the "Latest News" channel AND the BRCD "Stock Watch" channel AND the CSCO "Stock Watch" channel. In this way, an alert is generated when the following condition is present: Both the words "Brocade" and "Cisco" are detected in the "Latest News" channel AND when a share price "greater than $9.26" is detected via the BRCD "Stock Watch" channel AND when a share price "greater than $$23.63" is detected via the CSCO "Stock Watch" channel.

The query builder portion 342 of the create channel window 338 also provides notification settings. For example, the user 116 may select notify by: Current Device, Email, IM, SMS, Mobile, and the like. The user 116 may select one or more. The query builder portion 342 of the create channel window 338 also provides channel name field. In one example, the user 116 enters "Custom Alert." When the setup is complete, the user 116 selects a "Create Channel" button to deploy the new "Custom Alert" channel. By pressing the "Create Channel" button, certain processes occur, such as, but not limited to, the channel server 430 is updated accordingly, a touchlet is created and loaded into the client, all events set up on the menu are registered with the event manager, the user's configuration is updated with the notification preferences for this channel, the event manager begins monitoring the data streams according to the query. The touchlet is updated in real time as to the status of the three variables.

Figure 22:
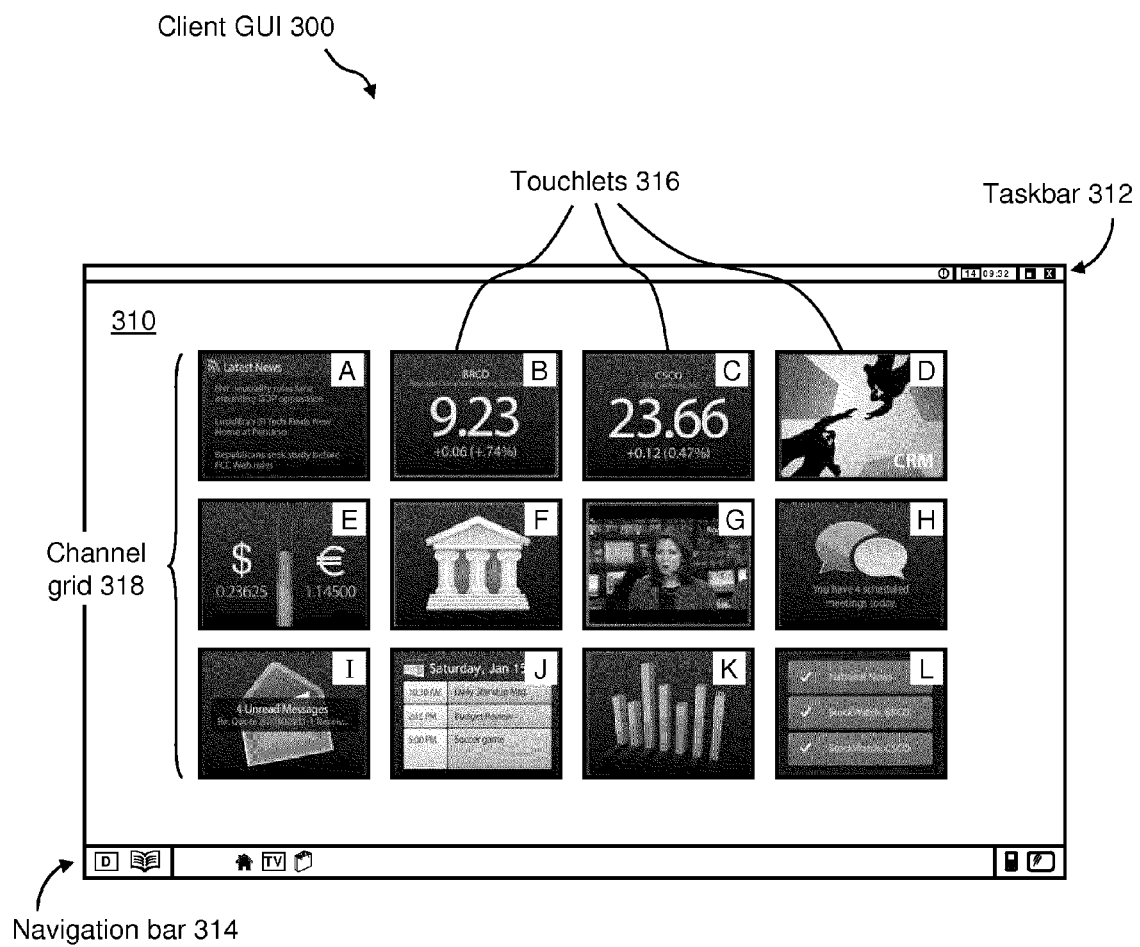

In this example and referring now to FIG. 22, a "Custom Alert" touchlet 316L is created and presented in channel grid 318. The "Custom Alert" touchlet 316L displays the three components that the channel is eventing off. In this view, the "Custom Alert" touchlet 316L displays the three components (e.g., news, BRCD, and CSCO), which are all in a no alert condition. In one example, the no alert condition for each component is to display the component in a green color in the "Custom Alert" touchlet 316L. Therefore, FIG. 22 shows all three components in green to indicate that no alert conditions are present.

Figure 23:
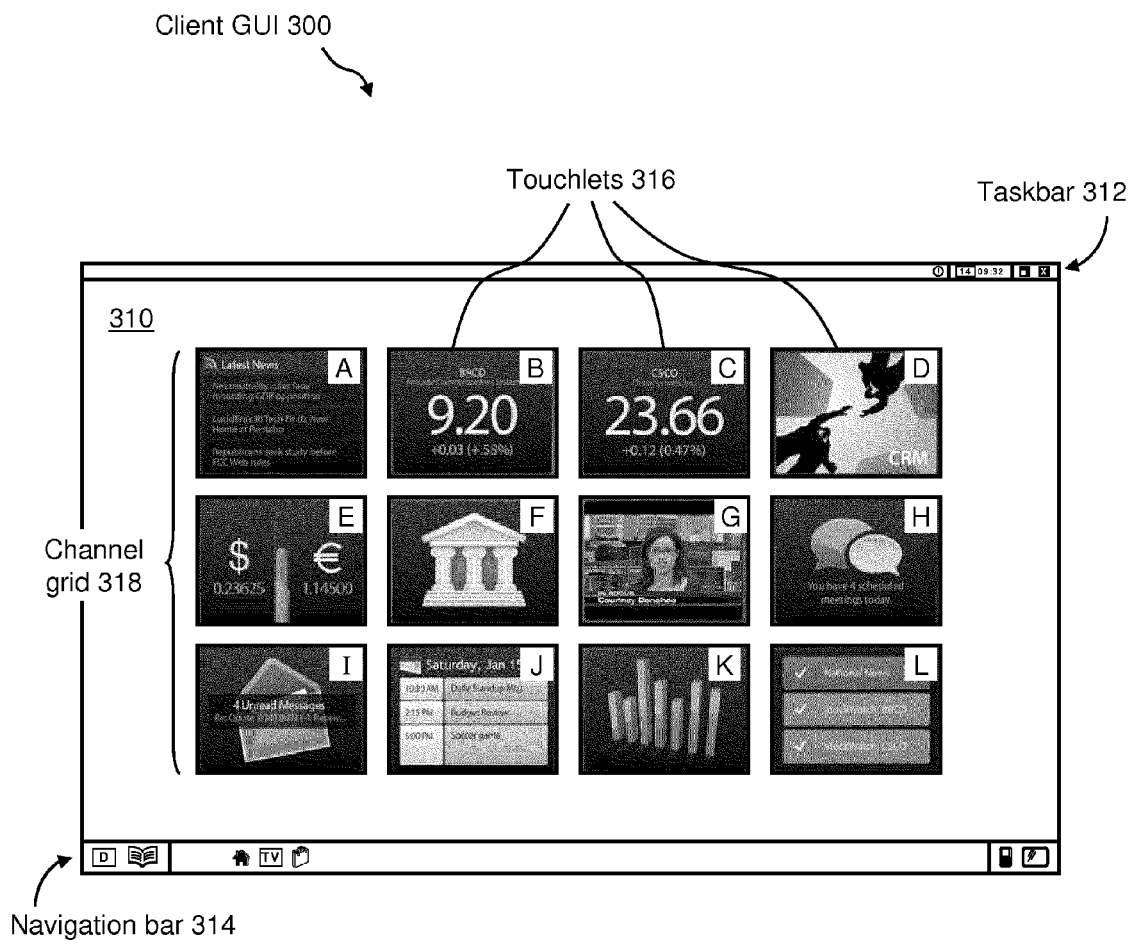

Referring now to FIG. 23, two of the three alert conditions are met and the "Custom Alert" touchlet 316L displays a warning state to the user 116. In this example, the BRCD and the CSCO conditions are met, but the news condition is not yet met. Therefore, the color of the BRCD and CSCO components may be changed from green to yellow, while the news component remains green. In this way, the user 116 may perceive a warning that, while the alert condition is not yet fully met, an alert may be eminent.

Figure 24:
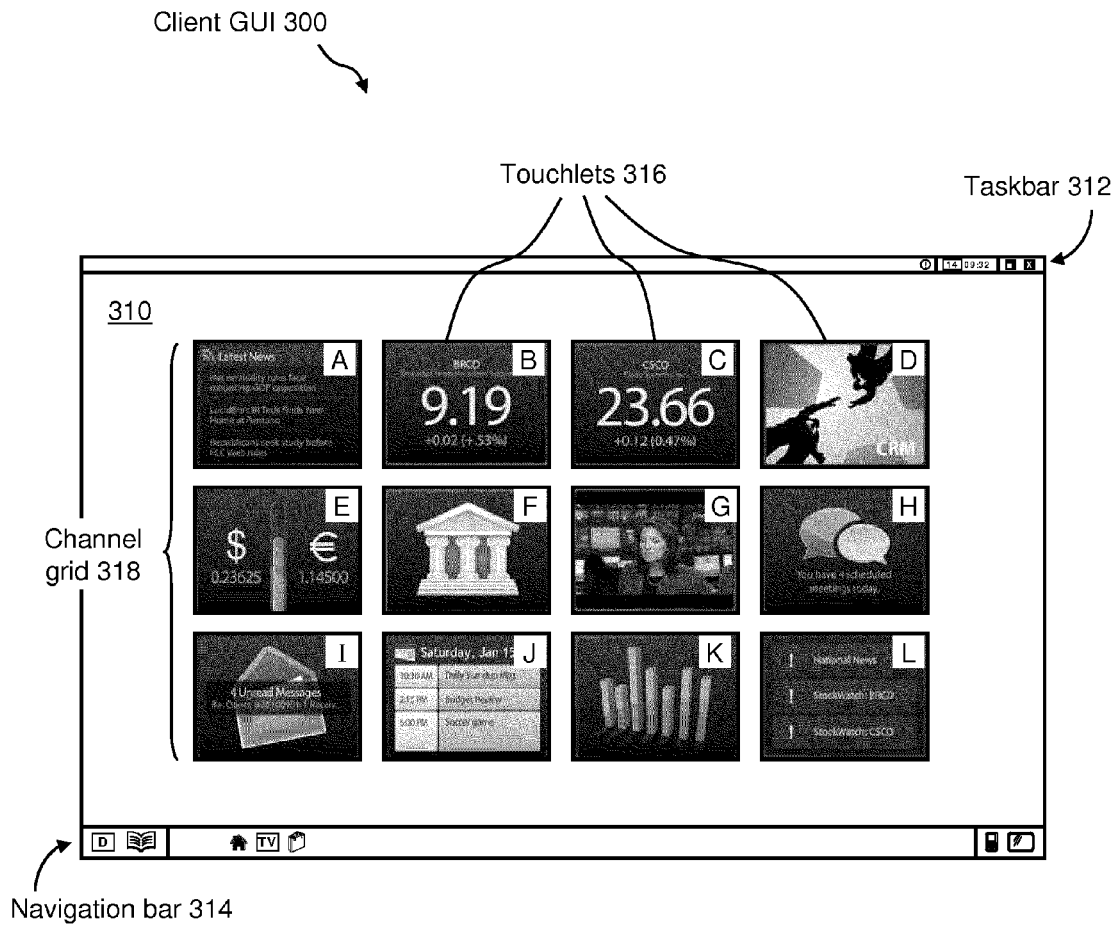

Referring now to FIG. 24, all three alert conditions are met and the "Custom Alert" touchlet 316L displays an alert state to the user 116. In this example, the news, BRCD, and CSCO conditions are met. Therefore, the color of the news, BRCD, and CSCO components in the "Custom Alert" touchlet 316L may be changed to red. In this way, the user 116 may receive the notification that the alert condition is fully met.

Referring again to FIG. 24, in this view other alerts are presented in certain touchlets 316 of channel grid 318. For example, touchlet 316H, which may be a business calendar channel, is displaying a "You have 4 scheduled meetings today" alert. Touchlet 316I, which may be an email channel, is displaying a "4 unread messages" alert. Both of these alerts are example of non-actionable alerts, as these are informational alerts that do not require user action. For example, the user may choose or not choose to launch the email channel and read his/her emails. However, if the user should choose to launch the email channel and read his/her emails, the "4 unread messages" alert is cleared.

Figure 25:
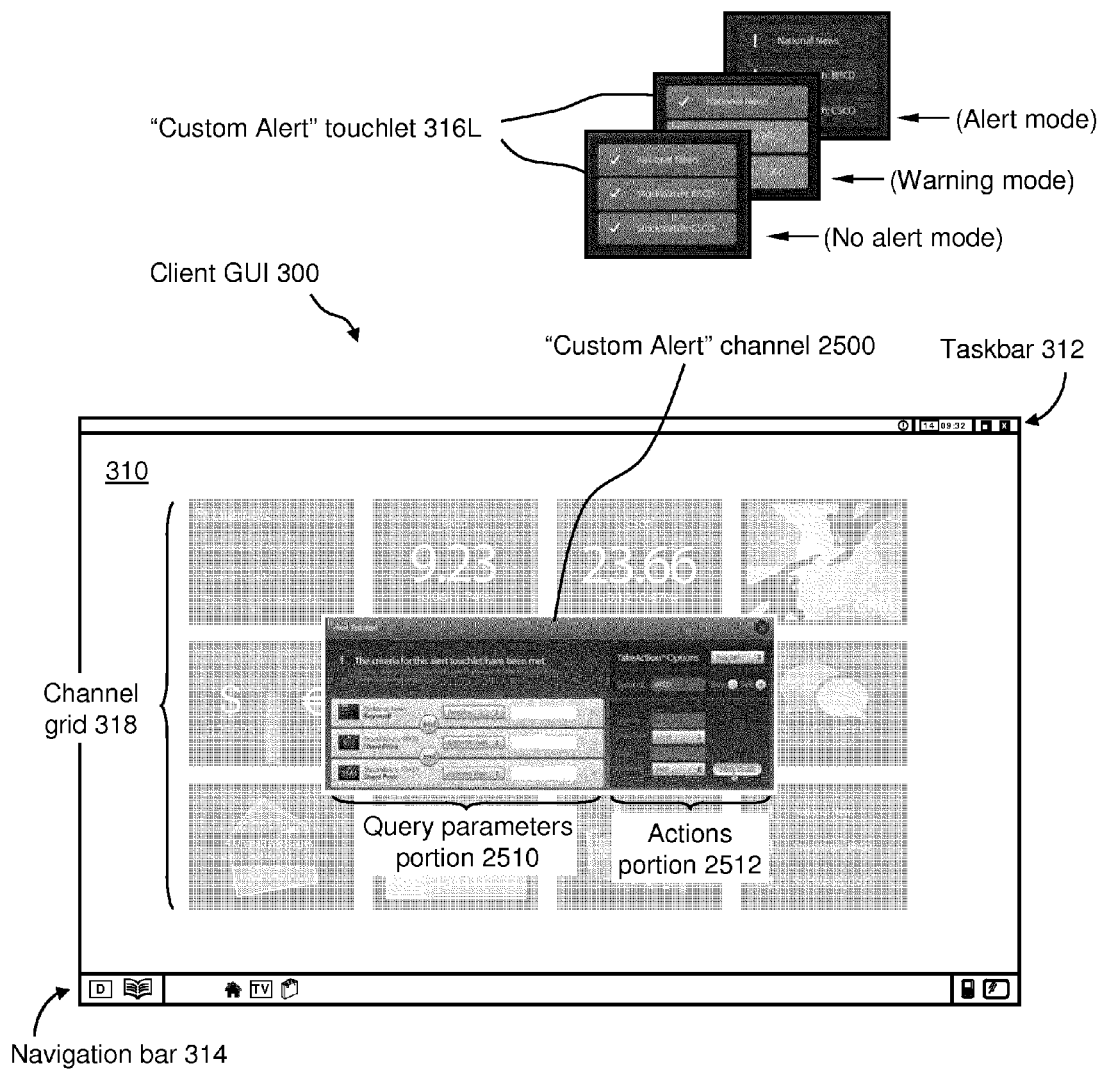

Referring now to FIG. 25, the "Custom Alert" channel provides an alert that is actionable. That is, upon receiving the alert via "Custom Alert" touchlet 316L, the user 116, who may be a stock broker, may take certain action. By clicking on the "Custom Alert" touchlet 316L, which may be in an alert state, the associated "Custom Alert" channel 2500 may be presented to the user 116. For example, FIG. 25 shows the GUI for an example of the "Custom Alert" channel 2500. The GUI for the "Custom Alert" channel 2500 may include, for example, a query parameters portion 2510 and an actions portion 2512.

The query parameters portion 2510 allows the user 116 to, for example, adjust the query parameters, add more conditions, change conditions, remove conditions, and the like. The actions portion 2512 allows the user 116 to perform certain actions based on the alert. For example, the actions portion 2512 may provide mechanisms by which the user 116 may perform stock trading transactions (e.g., buying and selling stock), similar to trading window 1324 of "Stock Watch" channel 1300 of FIG. 16, which may be supported by the "TD Ameritrade" web service.

The "Custom Alert" channel 2500 is used to generate an alert that is of particular importance to the user 116. The "Custom Alert" channel 2500 is an example of the user-centric aspect of PID application 112 in which only information that is of most importance to the user is processed and/or presented to the user 116. The aforementioned process of combining two or more independent channels to create a new channel (and touchlet) and a process of eventing off of the combined data is an example of the capability of PID application 112 to allow the user 116 to action based on disparate data that is of interest to the user and conditions set by the user.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, some embodiments may be implemented via one or more controllers, which may employ hardware, software or a combination thereof. In some embodiments discussed herein, one or more controllers may be implemented, at least in part, as a state machine.

When any aspect of an embodiment is implemented at least in part in software, the software code can be executed on any suitable processor or collection of processors, whether provided in a single device or computer or distributed among multiple devices/computers.

In this respect, various aspects of the invention, may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus to provide secure user-centric information on at least one user platform operated by a user, and to evaluate at least some of the secure user-centric information, the apparatus comprising:
   at least one communication interface facilitating wired and/or wireless communications with the at least one user platform via one or more transmission media;
   at least one memory storing processor-executable instructions; and
   at least one processor communicatively coupled to the at least one communication interface and the at least one memory, retrieving processor-exectuable instructions from the at least one memory, and executing the processor-executable instructions to provide and evaluate at least some of the secure user-centric information by:
     A) implementing a channel grid framework including a matrix of a plurality of authorized channels through which the user receives and/or interacts with, via the at least one user platform, respective portions of the secure user-centric information based at least in part on information access rights and/or security protocols respectively associated with the plurality of authorized channels, the plurality of authorized channels including at least a first channel through which the user receives and/or interacts with first channel information constituting a first portion of the secure user-centric information;
     B) establishing a user profile to identify user preferences, platform identities, and service support instructions that determine how the secure user-centric information behaves on the at least one user platform;
     C) receiving configuration data indicating one or more user preferences regarding alerts transmitted via the first channel based on the user profile;
     D) receiving session data indicating a current state of at least one external device of the user;
     E) monitoring at least the first channel information so as to determine one or more events, conditions, logical workflows, discrete information values or signal data, based on at least one threshold condition or parameter relating to the first channel information and determined based on the user preferences indicated by the configuration data; and
   if the one or more events, conditions, logical workflows, discrete information values or signal data is/are determined in E):
     F) determining a notification method by which to provide at least one alert on the at least one external device based on the current state of the at least one external device indicated by the session data;
     G) generating notification data according to the determined notification method, wherein the notification data is configured to cause the at least one external device to provide the at least one alert on the at least one external device; and
     H) controlling the at least one communication interface to transmit the notification data to the at least one external device via the first channel without being requested by the user, wherein the transmission of the notification data to the at least one external device is based at least in part on information access rights and/or security protocols respectively associated with the corresponding plurality of authorized channels, the user, and the at least one user platform.

2. The apparatus of claim 1, wherein if the one or more events, conditions, logical workflows, discrete information values or signal data is/are determined in E), the at least one processor performs H).

3. The apparatus of claim 1, wherein if the one or more events, conditions, logical workflows, discrete information values or signal data is/are determined in E), the at least one processor controls the at least one memory so as to store trigger information relating to the one or more determined events, conditions, logical workflows, discrete information values or signal data.

4. The apparatus of claim 3, wherein if the one or more events, conditions, logical workflows, discrete information values or signal data is/are determined in E), the at least one processor further performs H).

5. The apparatus of claim 1, wherein the first channel information includes at least one of:
   text information;
   graphic information;
   one or more pictures;
   one or more videos;
   audio or digital sound;
   streaming data, audio or video;
   content associated with an executing computer application;
   voice-over-IP communication;
   instant messaging/SMS information;
   video-conferencing information;
   environmental monitoring information;
   financial services information;
   enterprise resource planning information;
   enterprise content management information;
   building information;
   project management information;
   product lifecycle management information;
   RSS (Really Simple Syndication) reader information;
   remote device control/interaction information;
   a three-dimensional graphic visualization of one or more objects and/or immersive environments;
   one or more word processing documents;
   one or more spreadsheets;
   one or more presentation/slide shows;
   email; and
   address book information.

6. The apparatus of claim 1, wherein the at least one threshold condition or parameter includes a numerical limit or a trend.

7. The apparatus of claim 1, wherein E) comprises:
   E1) making a comparison of the monitored first channel information and the at least one threshold condition or parameter based at least in part on at least one criterion for the comparison; and E2) establishing a trigger, based at least in part on E1), if the at least one criterion is met.

8. The apparatus of claim 7, wherein the at least one criterion for the comparison includes at least one of:
exceeding a quantified numerical limit; and
multiple similar events trending in a certain direction.

9. The apparatus of claim 7, wherein the at least one processor controls the at least one memory so as to store trigger information relating to the one or more determined events, conditions, logical workflows, discrete information values or signal data, and wherein the trigger information includes at least one of:
one or more values or other information content associated with the monitored first channel information that resulted in the trigger;
one or more date stamps and/or time stamps associated with the one or more values or the other information content associated with the monitored first channel information that resulted in the trigger;
an identifier for one or more content sources providing at least some of the monitored first channel information that resulted in the trigger;
the at least one criterion for the comparison that resulted in the trigger.

10. The apparatus of claim 1, wherein the at least one processor performs H), and wherein the at least one alert includes at least one of:
at least one visual alert;
at least one auditory alert;
at least one email message; and
at least one SMS text message.

11. The apparatus of claim 1, wherein the at least one processor performs H), and wherein the at least one alert includes activation of at least one channel of the plurality of channels.

12. The apparatus of claim 1, wherein the at least one processor performs H), and wherein the at least one alert includes a notification to a law enforcement agency.

13. The apparatus of claim 1, wherein the at least one processor performs H), and wherein:
H) comprises transmitting the notification data so as to generate the at least one alert on at least one external device;
the at least one processor further provides the at least some of the secure user-centric information by:
I) controlling the at least one communication interface so as to transmit to the at least one external device channel information relating to at least one authorized channel of the plurality of authorized channels implemented in A); and
the notification data transmitted in H) causes an appearance of the at least one authorized channel, as represented on the at least one external device, to change so as to generate the at least one alert on the at least one external device.

14. The apparatus of claim 13, wherein the at least one external device includes the at least one user platform.

15. The apparatus of claim 13, wherein the at least one authorized channel includes the first channel.

16. The apparatus of claim 13, wherein the notification data transmitted in H) causes the at least one authorized channel, as represented on the at least one external device, to expand into additional channels represented on the at least one external device so as to generate the at least one alert on the at least one external device.

17. The apparatus of claim 13, wherein the notification data transmitted in H) renders the at least one authorized channel, as represented on the at least one external device, as a simulated three-dimensional representation of the channel information relating to the at least one authorized channel, so as to generate the at least one alert on the at least one external device.

18. The apparatus of claim 1, wherein the at least one processor performs H), and wherein in H), the at least one external device includes at least one of a mobile device, a television, and a Blu-ray player.

19. The apparatus of claim 1, wherein the at least one processor further provides and evaluates at least some of the secure user-centric information by:
I) controlling the at least one communication interface to transmit at least some of the first channel information to the at least one user platform.

20. The apparatus of claim 19, wherein the at least one processor performs H), and wherein in H), the at least one external device includes the at least one user platform.

21. The apparatus of claim 20, wherein:
the at least one user platform includes a plurality of user platforms;
I) comprises controlling the at least one communication interface to transmit the at least some of the first channel information to the plurality of user platforms; and
H) comprises controlling the at least one communication interface to transmit the notification data so as to generate at least one alert on the plurality of user platforms.

22. The apparatus of claim 21, wherein:
the plurality of user platforms include multiple different types of computing devices and/or multiple different types of communication devices.

23. The apparatus of claim 1, wherein the at least one processor further provides and evaluates at least some of the secure user-centric information by:
I) authenticating the user and the at least one user platform to receive at least the first channel information and/or the at least one alert.

24. The apparatus of claim 23, wherein I) comprises authenticating the user and the at least one user platform based at least in part on the user profile.

25. The apparatus of claim 23, wherein the at least one memory stores an authentication directory to provide the information access rights and/or security protocols respectively associated with the corresponding plurality of authorized channels, the user, and the user platform, the authentication directory including a plurality of user accounts, a plurality of device accounts, and a plurality of application accounts, and wherein I) comprises authenticating the user and the at least one user platform to receive at least the first channel information based at least in part on the authentication directory.

26. The apparatus of claim 23, wherein the at least one processor performs H), and wherein in H), the at least one external device includes the at least one user platform.

27. The apparatus of claim 23, wherein the at least one processor further provides and evaluates at least some of the secure user-centric information by:
J) confirming at least one subscriber to the at least one alert; and
K) determining one or more active devices of the at least one subscriber to the at least one alert.

28. The apparatus of claim 27, wherein the at least one processor performs H), and wherein in H), the at least one external device includes the one or more devices of the at least one subscriber to the at least one alert.

29. The apparatus of claim 1, wherein in A), the at least one processor implements a channel server that defines one or more visual characterizations, one or more functions or features, and/or one or more information types provided by respective channels of the plurality of channels through which the user receives and/or interacts with the respective portions of the secure user-centric information, wherein the channel server implements at least the first channel, and wherein the at least one processor further provides and evaluates at least some of the secure user-centric information by:

I) controlling the at least one communication interface to transmit at least some of the first channel information to the at least one user platform.

30. The apparatus of claim 29, wherein the at least one memory further stores at least one database including registries to one or more services and/or applications used by the channel server to implement at least the first channel and provide the first channel information.

31. The apparatus of claim 30, wherein in E) and H), the at least one processor implements a channel alert server, communicatively coupled to the channel server, to monitor at least the first channel information so as to determine the one or more events, conditions, logical workflows, discrete information values or signal data based on the at least one threshold condition or parameter, and to generate at least one alert in response to the one or more determined events, conditions, logical workflows, discrete information values or signal data relating to the first channel information.

32. The apparatus of claim 31, wherein the at least one processor further provides and evaluates at least some of the secure user-centric information by:

implementing at least one other server, communicatively coupled to the channel server and the channel alert server, to provide the one or more services and/or applications registered in the at least one database and used by the channel server to implement the first channel and provide the first channel information, wherein the at least one other server includes at least one of:

a video server to transform, transmit, and/or support delivery of video information and/or audio information included in the first channel information;

an enterprise content management server to provide configuration, templates, visual content, user interface controls and management control for the first channel information;

a device integration server to manage streaming or real-time information from a machine or device, which streaming or real-time information is included in the first channel information;

a portal server to facilitate Internet-based function access by the at least one communication interface of the user platform; and a virtual world server to provide a three-dimensional visualization of, and/or interaction with, the first channel information.

33. The apparatus of claim 32, wherein at least a portion of one or more of the first channel information, the video information, the audio information, the streaming or real-time information from a machine or device, the events, the conditions, the logical workflows, the discrete information values, and the signal data are stored in the at least one database.

34. The apparatus of claim 32, wherein the at least one processor establishes a service-oriented architecture (SOA) including an enterprise service bus, wherein the channel server, the channel alert server, and the at least one other server are implemented as logical components that are communicatively coupled to each other and the at least one database via the enterprise service bus.

35. A computer-implemented method for evaluating secure user-centric information to be provided on at least one user platform operated by a user, the method comprising:

A) electronically implementing a channel grid framework including a matrix of a plurality of authorized channels through which the user receives and/or interacts with, via the at least one user platform, respective portions of the secure user-centric information based at least in part on information access rights and/or security protocols respectively associated with the plurality of authorized channels, the plurality of authorized channels including at least a first channel through which the user receives and/or interacts with first channel information constituting a first portion of the secure user-centric information;

B) establishing a user profile to identify user preferences, platform identities, and service support instructions that determine how the secure user-centric information behaves on the at least one user platform;

C) receiving configuration data indicating one or more user preferences regarding alerts transmitted via the first channel based on the user profile;

D) receiving session data indicating a current state of at least one external device of the user;

E) electronically monitoring at least the first channel information so as to determine one or more events, conditions, logical workflows, discrete information values or signal data, based on at least one threshold condition or parameter relating to the first channel information and determined based on the user preferences indicated by the configuration data; and if the one or more events, conditions, logical workflows, discrete information values or signal data is/are determined in E):

F) determining a notification method by which to provide at least one alert on the at least one external device based on the current state of the at least one external device indicated by the session data;

G) generating notification data according to the determined notification method, wherein the notification data is configured to cause the at least one external device to provide the at least one alert on the at least one external device; and H) electronically transmitting at least one alert to, or transmitting the notification data to the at least one external device via the first channel without being requested by the user, wherein the transmission of the at least one alert or notification data to the at least one external device is based at least in part on information access rights and/or security protocols respectively associated with the corresponding plurality of authorized channels, the user, and the at least one user platform.

36. At least one non-transitory computer readable storage medium encoded with processor-executable instructions that, when executed by at least one processor, perform a method for evaluating secure user-centric information to be provided on at least one user platform operated by a user, the method comprising:

A) implementing a channel grid framework including a matrix of a plurality of authorized channels through which the user receives and/or interacts with, via the at least one user platform, respective portions of the secure user-centric information based at least in part on information access rights and/or security protocols respectively associated with the plurality of authorized channels, the plurality of authorized channels including at least a first channel through which the user receives and/or interacts with first channel information constituting a first portion of the secure user-centric information;

B) establishing a user profile to identify user preferences, platform identities, and service support instructions that determine how the secure user-centric information behaves on the at least one user platform;

C) receiving configuration data indicating one or more user preferences regarding alerts transmitted via the first channel based on the user profile;

D) receiving session data indicating a current state of at least one external device of the user;

E) monitoring at least the first channel information so as to determine one or more events, conditions, logical workflows, discrete information values or signal data, based on at least one threshold condition or parameter relating to the first channel information and determined based on the user preferences indicated by the configuration data; and if the one or more events, conditions, logical workflows, discrete information values or signal data is/are determined in E):

F) determining a notification method by which to provide at least one alert on the at least one external device based on the current state of the at least one external device indicated by the session data;

G) generating notification data according to the determined notification method, wherein the notification data is configured to cause the at least one external device to provide the at least one alert on the at least one external device; and H) transmitting at least one alert to, or transmitting the notification data to the at least one external device via the first channel without being requested by the user, wherein the transmission of the at least one alert or notification data to the at least one external device is based at least in part on information access rights and/or security protocols respectively associated with the corresponding plurality of authorized channels, the user, and the at least one user platform.

* * * * *